US012621143B2

(12) United States Patent (10) Patent No.: US 12,621,143 B2
Nomani et al. (45) Date of Patent: May 5, 2026

(54) SYSTEMS AND METHODS FOR BLOCKCHAIN-BASED SECURE KEY EXCHANGE WITH KEY ESCROW FALLBACK

(71) Applicant: Verizon Patent and Licensing Inc., Basking Ridge, NJ (US)

(72) Inventors: Muhammad Salman Nomani, Hillsborough, NJ (US); John M. Stokes, Yorba Linda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 800 days.

(21) Appl. No.: 17/658,966

(22) Filed: Apr. 12, 2022

(65) Prior Publication Data

US 2022/0368524 A1 Nov. 17, 2022

Related U.S. Application Data

(63) Continuation-in-part of application No. 17/321,378, filed on May 14, 2021, now Pat. No. 11,849,032.

(51) Int. Cl.
H04L 9/00 (2022.01)
H04L 9/08 (2006.01)
H04L 9/32 (2006.01)

(52) U.S. Cl.
CPC ............ H04L 9/0894 (2013.01); H04L 9/006 (2013.01); H04L 9/0822 (2013.01)

(58) Field of Classification Search
CPC ..... H04L 9/0894; H04L 9/006; H04L 9/0822; H04L 9/0841; H04L 9/3297; H04L 9/50
See application file for complete search history.

(56) References Cited

U.S. PATENT DOCUMENTS

| | | | | |
|---|---|---|---|---|
| 10,218,501 B2 * | 2/2019 | Pang | ...................... | H04L 9/3247 |
| 10,735,193 B1 * | 8/2020 | Knas | ...................... | H04L 9/3239 |
| 10,742,422 B1 * | 8/2020 | Jarjoui | .................. | H04L 9/0631 |
| 10,999,260 B1 | 5/2021 | Silvestri et al. | | |
| 11,423,474 B1 | 8/2022 | Ribeiro | | |

(Continued)

OTHER PUBLICATIONS

"Key escrow", Wikipedia, Nov. 20, 2020 (available at https://en. wikipedia.org/w/index.php?title=Key_excrow&oldid=989705940, visited Apr. 23, 2021).

(Continued)

*Primary Examiner* — Andrew Suh

(57) ABSTRACT

A system described herein provides for the secure maintaining and providing of information, such as public keys used in Public Key Infrastructure ("PKI") techniques or other techniques, using a distributed ledger (e.g., "blockchain") system with a fallback to a key escrow system. A first device may encrypt a communication using a first key, and output the encrypted communication to a second device. The first device may attempt to record a second key, that is associated with the first key, to the blockchain system, and may determine that the second key was not recorded to the blockchain system based on the attempt. The first device may output the second key to a third device based on determining that the second key was not recorded to the blockchain system. The second device may obtain the second key from the third device, and use the second key to decrypt the encrypted communication.

20 Claims, 15 Drawing Sheets

(56)                    References Cited

U.S. PATENT DOCUMENTS

| 11,758,393 B1 * | 9/2023 | Stolbikov | H04L 9/3247 |
| | | | 713/171 |
| 2018/0032383 A1 * | 2/2018 | Surcouf | H04L 9/3239 |
| 2019/0268312 A1 | 8/2019 | Ma et al. | |
| 2020/0012527 A1 * | 1/2020 | Hartsock | H04L 9/14 |
| 2020/0014529 A1 * | 1/2020 | Kanza | G07F 9/001 |
| 2020/0092330 A1 * | 3/2020 | Hayton | H04L 9/0869 |
| 2021/0067328 A1 * | 3/2021 | Verheyen | H04L 63/0442 |
| 2021/0352471 A1 * | 11/2021 | Hallock | G06N 7/01 |
| 2022/0107994 A1 | 4/2022 | Bernardi | |
| 2022/0294611 A1 | 9/2022 | Katsumata et al. | |
| 2023/0016373 A1 * | 1/2023 | Kasamatsu | G06Q 30/018 |
| 2023/0021047 A1 | 1/2023 | Ammar et al. | |
| 2023/0121852 A1 * | 4/2023 | Yan | H04L 9/3268 |
| | | | 713/153 |

OTHER PUBLICATIONS

Maheshwari, "Learn step-by-step how to set up a basic blockchain network", Think 2021: The premier hybrid cloud and AI event, Jul. 10, 2020 (available at https://developer.IBM.com/technologies/ blockchain/tutorials/quick-start-guide-for-IBM-blockchain-plalform/, visited May 7, 2021).
Perrin, et al., "The Double Ratchet Algorithm", Signal, Nov. 20, 2016 (available at https://signal.org/docs/specifications/ doubleratchet/, visited Apr. 23, 2021).

* cited by examiner

500

502 — Establish communication session associated with session ID

504 — Generate root keys (*e.g.*, asymmetric key pair)

506 — Record public root key to blockchain system with session ID

508 — Utilize root keys to generate send key

510 — Encrypt communication using send key

512 — Output encrypted communication via communication session

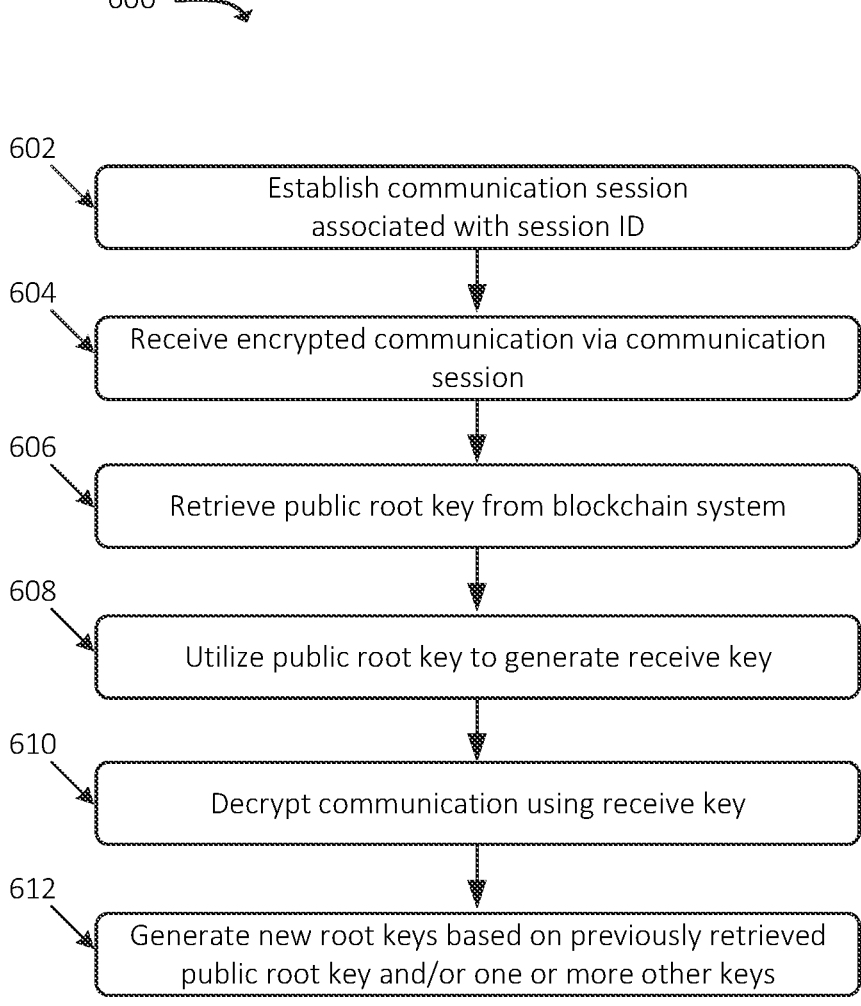

600

602 Establish communication session
associated with session ID

604 Receive encrypted communication via communication
session

606 Retrieve public root key from blockchain system

608 Utilize public root key to generate receive key

610 Decrypt communication using receive key

612 Generate new root keys based on previously retrieved
public root key and/or one or more other keys

FIG. 6

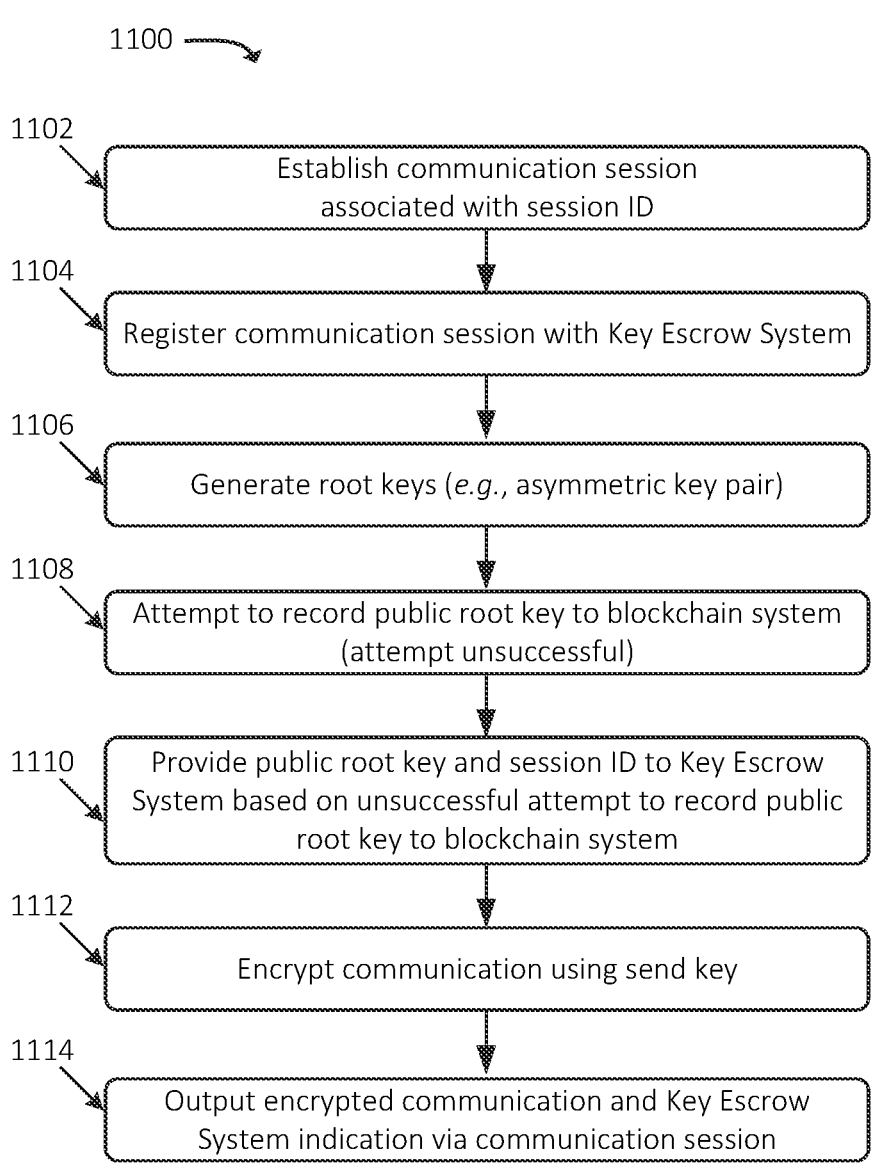

1100

1102 — Establish communication session associated with session ID

1104 — Register communication session with Key Escrow System

1106 — Generate root keys (*e.g.*, asymmetric key pair)

1108 — Attempt to record public root key to blockchain system (attempt unsuccessful)

1110 — Provide public root key and session ID to Key Escrow System based on unsuccessful attempt to record public root key to blockchain system 1112 — Encrypt communication using send key 1114 — Output encrypted communication and Key Escrow System indication via communication session

FIG. 11

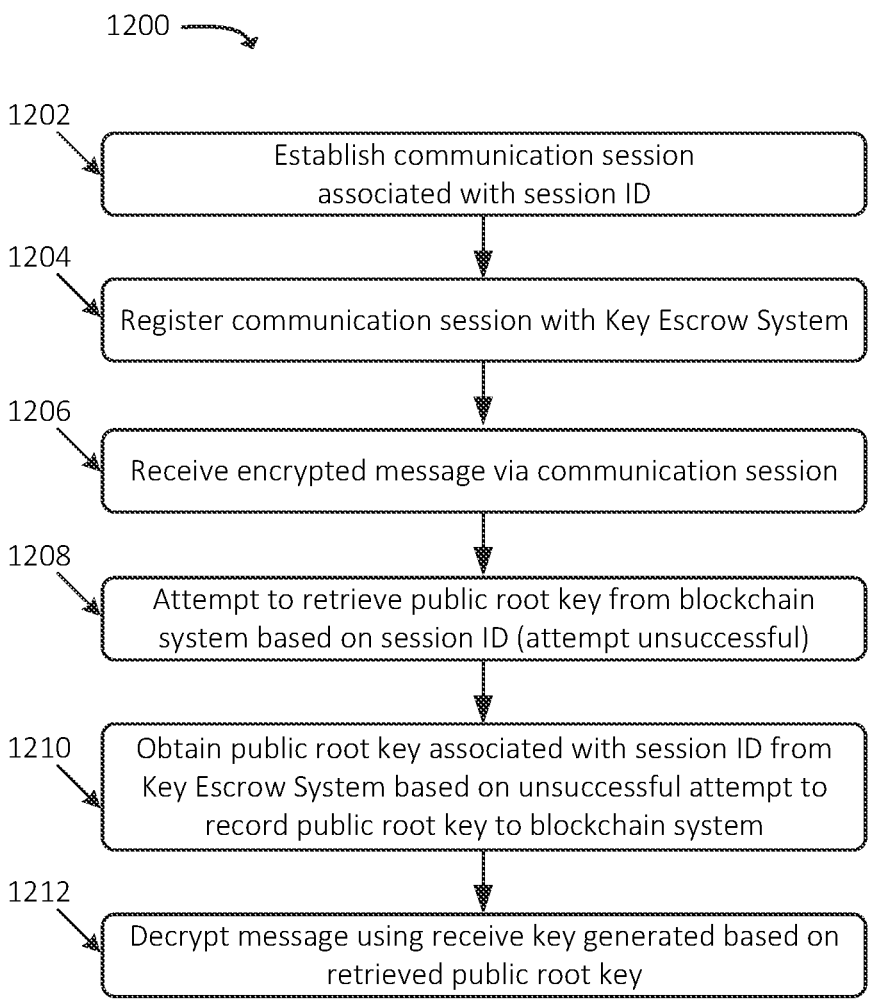

1200

1202 — Establish communication session associated with session ID

1204 — Register communication session with Key Escrow System

1206 — Receive encrypted message via communication session

1208 — Attempt to retrieve public root key from blockchain system based on session ID (attempt unsuccessful)

1210 — Obtain public root key associated with session ID from Key Escrow System based on unsuccessful attempt to record public root key to blockchain system 1212 — Decrypt message using receive key generated based on retrieved public root key

SYSTEMS AND METHODS FOR BLOCKCHAIN-BASED SECURE KEY EXCHANGE WITH KEY ESCROW FALLBACK

CROSS-REFERENCE TO RELATED APPLICATION

This Application is a Continuation-in-Part of U.S. patent application Ser. No. 17/321,378 filed on May 14, 2021, titled "SYSTEMS AND METHODS FOR BLOCKCHAIN-BASED SECURE KEY EXCHANGE," the contents of which are herein incorporated by reference in their entirety.

BACKGROUND

Some encryption techniques, such as Public Key Infrastructure ("PKI") techniques, may make use of public keys, which may be used to encrypt messages that may be decrypted using an associated private key, and/or may be used in other techniques. Public keys may be distributed or stored by key escrow systems, which may provide a single point of failure and/or an opportunity for a "man-in-the-middle" attack, via which public key may be obtained, modified, and/or otherwise compromised.

BRIEF DESCRIPTION OF THE DRAWINGS

FIGS. 5 and 6 illustrate example processes for using a shared public key via a private blockchain system, in accordance with some embodiments, in a communication that utilizes double ratchet techniques to secure communications;

FIG. 11 illustrates an example process for utilizing a Key Escrow System as a fallback for a blockchain system for a key distribution procedure, in accordance with some embodiments;

FIG. 12 illustrates an example process for utilizing a Key Escrow System as a fallback for a blockchain system for a key retrieval procedure, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the secure maintaining and providing of information, such as public keys used in PKI techniques or other techniques, using a secure distributed ledger (e.g., "blockchain") system. For example, embodiments described herein may utilize a blockchain system in lieu of a key escrow system in the exchange and/or providing of public keys in a Diffie-Hellman key exchange technique, a key wrap exchange technique, or other type of technique in which public keys are provided from one entity to another. For example, as discussed herein, a first entity may generate an asymmetric key pair that includes a public key and a private key, and may provide the public key to a blockchain system for retrieval by one or more other entities. For example, the entities may be engaged in a secure messaging session, in which messages are encrypted and may be decrypted using one or more keys, including the public key. For example, the messaging session may be associated with multiple key derivation functions, in which a first key or set of keys (e.g., "root" keys) are used in the generation of one or more other keys (e.g., "send" keys and/or "receive" keys). A root key derivation function, for example, may be performed by first and second entities engaged in the communication session to generate respective send and/or receive keys for each entity. The entities may make use of different private keys in their respective root derivation functions, but may utilize one or more shared public keys for their respective root derivation functions. Examples of techniques that make use of multiple key derivation functions, including a root derivation function utilizing one or more shared public keys, include a "double ratchet" encryption technique, a "Signal Protocol," and/or other types of techniques.

In some embodiments, the contents of the secured ledger system (e.g., blockchain) may be publicly available or accessible, but the information stored therein may have no meaning or use to an attacker or other malicious user, in the context of obtaining public keys associated with PKI techniques or other techniques. In some embodiments, a private blockchain may be used, in which only authorized entities are able to access the information stored in the private blockchain. Further, as records stored in a blockchain system are immutable, an attacker may be prevented from modifying public keys and thereby potentially having access to information encrypted based on such keys. For simplicity, embodiments described herein are described in the context of the secured ledger system being a blockchain system. However, similar concepts may apply to another type of secured ledger system other than a blockchain system.

Figure 1:
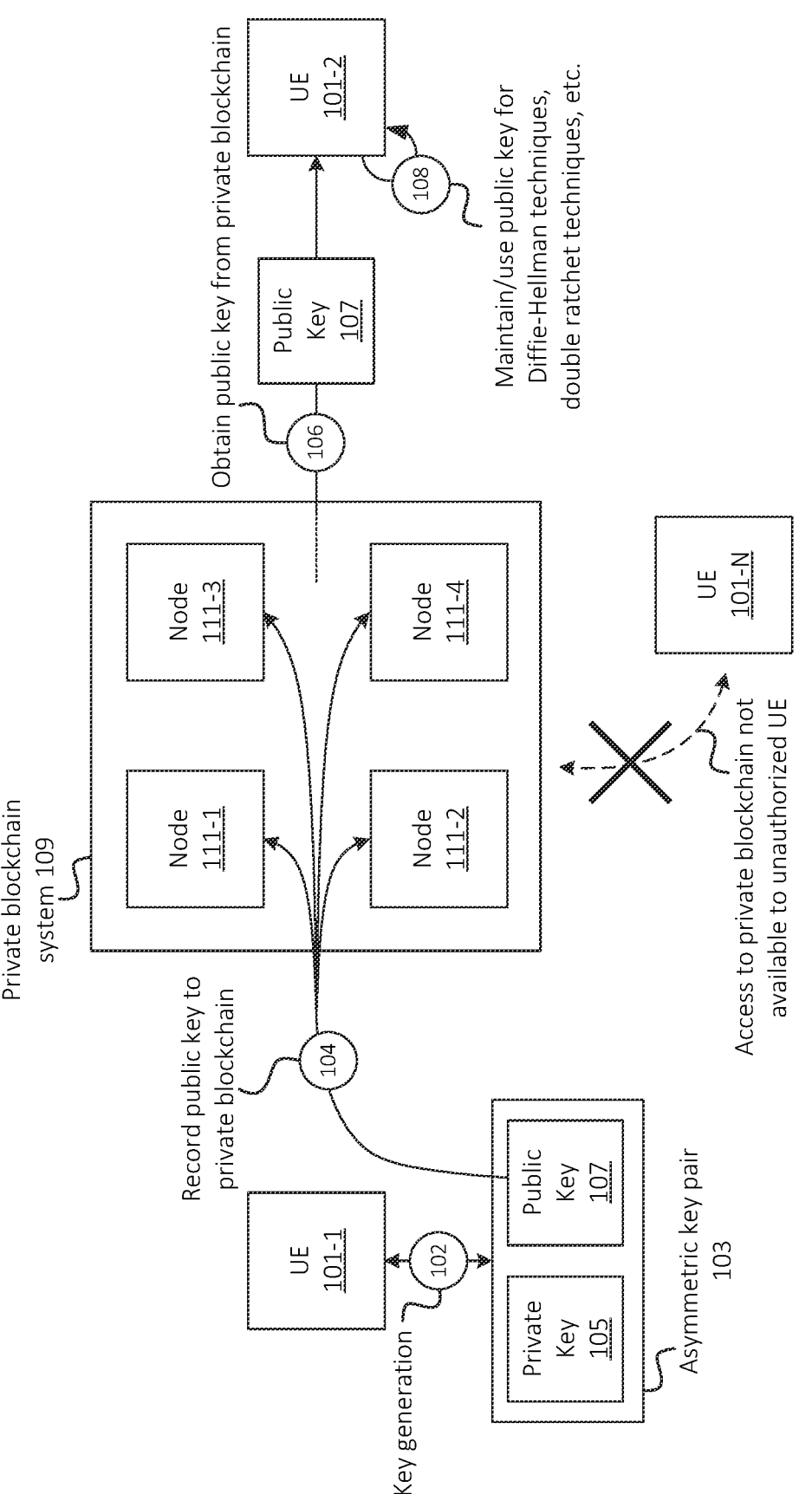
FIG. 1 illustrates an example overview of one or more embodiments described herein.

As shown in FIG. 1, a first entity, such as User Equipment ("UE") 101-1, may generate (at 102) a set of keys. The set of keys may be, and/or may include, asymmetric key pair 103, which may include private key 105 and public key 107. Private key 105 may be used to decrypt information encrypted by public key 107, may be used in a double ratchet and/or Signal Protocol technique, and/or may be used for other suitable purposes. UE 101-1 may securely store private key 105, such as in a local storage device associated with UE 101-1, in a private key store, in a Universal Integrated Circuit Card ("UICC"), and/or in some other secure location.

As further shown, UE 101-1 may record (at 104) the public key to a blockchain system, such as private blockchain system 109. As noted above, private blockchain system 109 may be "private," in that only authorized entities (e.g., authorized UEs, authorized users, etc.) may have access to the information stored in private blockchain system 109. The information stored in private blockchain system 109 may be organized as "blocks," where one particular record corresponds to one particular block, and/or where one block includes multiple records. A block may also include a reference to one or more other blocks (e.g., a "previous" block and/or a "next" block), such that a group of blocks and their associated references may form a "chain" of blocks. Further, private blockchain system 109 may include a set of nodes 111 that form a consensus regarding the blocks of which the blockchain is comprised, thus preventing unauthorized changes to the information stored in the blockchain, as well as resiliency in case any particular node 111 is compromised or otherwise becomes unavailable. In some embodiments, nodes 111 may each be implemented by a respective UE 101, such as a mobile telephone, a workstation computer, a tablet, an Internet of Things ("IoT") device, and/or other suitable type of device. While shown in the figure as being "external" to private blockchain system 109, in practice, UE 101-1 may be, and/or may implement, a particular node 111 associated with private blockchain system 109.

When recording the public key to private blockchain system 109, UE 101-1 may provide an identifier associated with UE 101-1 and/or other identifying information based on which the public key may be retrieved by an entity that may use the public key. For example, the record may include an Internet Protocol ("IP") address associated with UE 101-1, a device name, a user name, a Session Initiation Protocol ("SIP") address, and/or some other suitable information associated with UE 101-1.

Additionally, or alternatively, the record may include a session identifier, which may identify a communication session between UE 101-1 and another UE, such as UE 101-2. For example, UE 101-1 and UE 101-2 may be engaged in a secure messaging session, in which UE 101-1 and UE 101-2 exchange encrypted messages. The messaging session may be associated with a double ratchet technique, a Signal Protocol technique, and/or other type of technique in which UE 101-1 and UE 101-2 provide public keys to each other.

Briefly, for example, for each message sent between UE 101-1 and UE 101-2, a new public key may be generated (e.g., in an alternating fashion, where UE 101-1 generates a public key for a first message, UE 101-2 generates a public key for a second message, UE 101-1 generates a public key for a third message, and so on). As described below, these alternating shared public keys may serve as a first "ratchet" in a double ratchet technique to ensure security of the encrypted communications. For example, as discussed below, the public keys may be used to generate symmetric send and/or receive keys, which may be used to encrypt and/or decrypt communications between UE 101-1 and UE 101-2 without transmitting the send and/or receive keys between each other.

Private blockchain system 109 is illustrated as including four nodes 111-1, 111-2, 111-3, and 111-4. In practice, private blockchain system 109 may include fewer nodes and/or additional nodes. Private blockchain system 109 may, in some embodiments, be associated with one or more suitable authentication mechanisms whereby only authorized devices or systems are able to participate as nodes 111 of private blockchain system 109. For example, as discussed herein, particular users or UEs 101 may be specified or automatically identified (e.g., based on an address book or contact list associated with a particular UE 101 that is authorized to access private blockchain system 109 and/or some other suitable technique). As such, unauthorized devices, such as UE 101-N, may not be able to access information stored in private blockchain system 109 and/or may not be able to participate as a node 111 of private blockchain system 109. Further, as the nodes 111 of private blockchain system 109 may only include trusted devices, the integrity of the information stored by private blockchain system 109 may be enhanced, as the likelihood of a compromise or attack of private blockchain system 109 may be reduced or eliminated. Further, the recording and/or accessing of private blockchain system 109 may be private with respect to external devices that do not have access to private blockchain system 109.

In some embodiments, separate private blockchain systems 109 may be established for discrete groups, such as messaging or conversation groups (e.g., where a first communication session includes a first set of participants and is associated with a first private blockchain system 109, and where a second communication session includes a second set of participants and is associated with a second private blockchain system 109). In some embodiments, a single private blockchain system 109 may be associated with multiple communication sessions, where keys associated with a given communication session may be protected by a set of smart contracts or other security mechanisms that are accessible only to participants in the communication session.

Once recorded to private blockchain system 109, public key 107 may be obtained (at 106) by UE 101-2 and/or another device or system to which the information stored in private blockchain system 109 is available. For example, as noted above, UE 101-2 may be a UE with which UE 101-1 is engaged in a communication session via which UE 101-1 and UE 101-2 exchange encrypted communications. UE 101-2 may identify a record stored in private blockchain system 109 that includes the identifier associated with UE 101-1, a communication session associated with UE 101-1 and UE 101-2, and/or some other suitable identifier. In some embodiments, UE 101-2 may be a node 111 of private blockchain system 109, and may maintain a full copy of the blockchain stored by private blockchain system 109. In some embodiments, private blockchain system 109 may implement or be communicatively coupled to a search system, which may provide records that match a query. For example, UE 101-2 may query private blockchain system 109 for the identifier associated with UE 101-1 and/or a communication session with UE 101-1, and private blockchain system 109 may return one or more blocks that include the identifier associated with UE 101-1 and/or the communication session. In some embodiments, private blockchain system 109 may return, and/or UE 101-2 may otherwise identify, the latest (e.g., most current) block matching the query. In this manner, in situations where UE 101-1 has provided multiple public keys to private blockchain system 109 over time, UE 101-2 may be able to retrieve and/or otherwise identify the newest public key. Identifying the newest public key may be useful in a double ratchet technique, a Signal Protocol technique, and/or some other technique in which an updated public key is used for each message between UE 101-1 and UE 101-2. In some embodiments, public keys may be provided with sequence numbers or other information, based on which public keys associated with communications received in a non-sequential manner (e.g., out of order) may be identified.

In some embodiments, the public key may be provided as part of a Diffie-Hellman exchange or some other suitable technique in which public keys associated with multiple UEs 101 are exchanged amongst each other. UE 101-2 may accordingly maintain and/or use (at 108) the received public key for a double ratchet technique, a Signal Protocol technique, and/or in some other technique that involves a Diffie-Hellman key exchange or other type of key exchange procedure.

Figure 2:
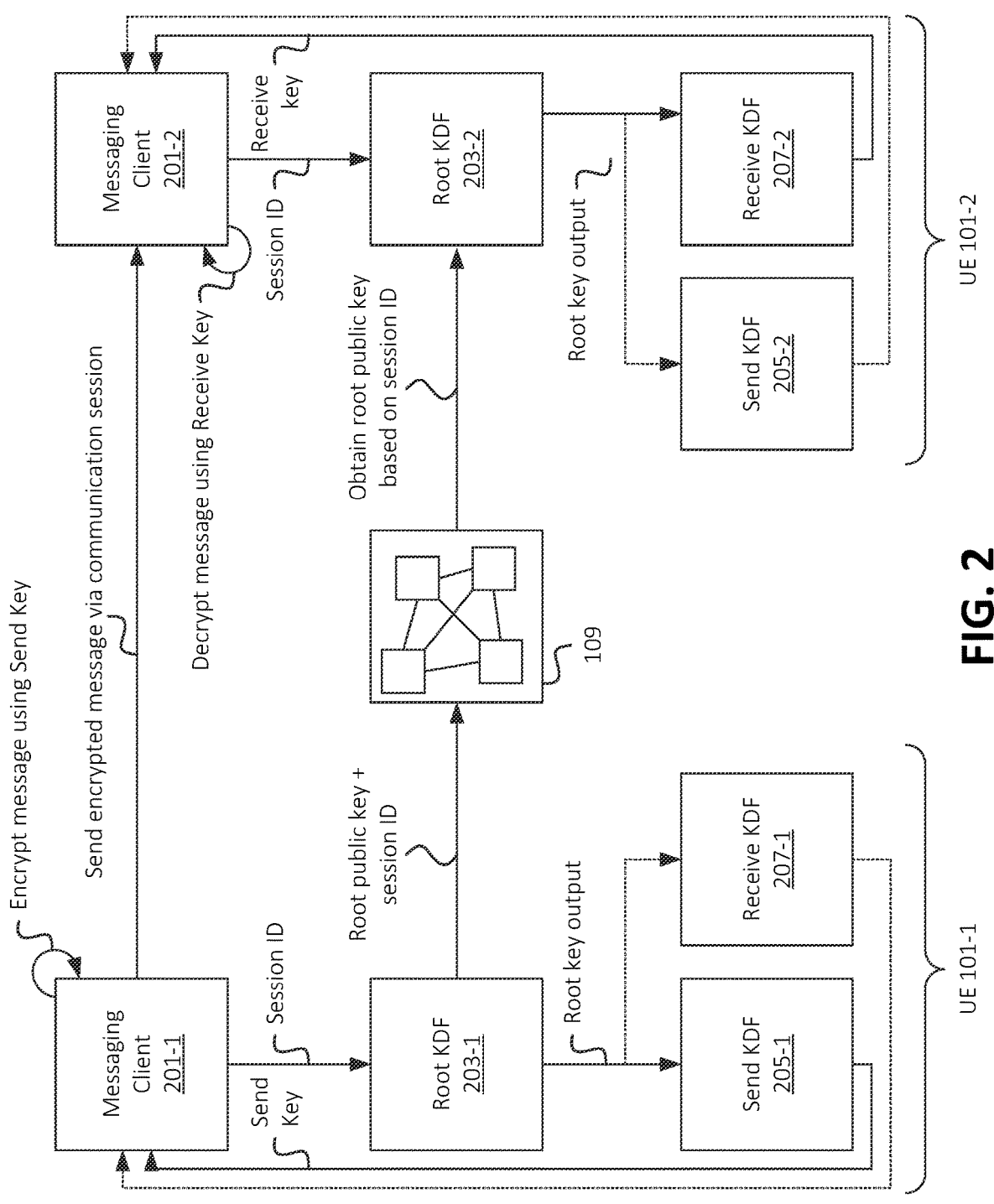
FIG. 2 illustrates an example of using a shared public key via a private blockchain system, in accordance with some embodiments, in a communication that utilizes double ratchet techniques to secure communications.

FIG. 2 illustrates an example of using a shared public key (e.g., shared via private blockchain system 109, in accordance with some embodiments) in a communication technique that utilizes double ratchet techniques to secure communications between UE 101-1 and UE 101-2. As shown, UE 101-1 and UE 101-2 may each include a respective messaging client 201, which may send and/or receive encrypted communications. For example, messaging client 201-1, associated with UE 101-1, may encrypt communications based on techniques described herein, and may send the encrypted communications to messaging client 201-2 associated with UE 101-2. Messaging client 201-2 may receive encrypted communications from UE 101-1 (e.g., from messaging client 201-1), may decrypt the communications based on techniques described herein, and may present the decrypted communications (e.g., via a graphical user interface ("GUI") or other suitable manner of presentation). Similarly, messaging client 201-2, associated with UE 101-2, may encrypt communications based on techniques described herein, and may send the encrypted communications to messaging client 201-1 associated with UE 101-1. Messaging client 201-1 may receive encrypted communications from UE 101-2 (e.g., from messaging client 201-2), may decrypt the communications based on techniques described herein, and may present the decrypted communications (e.g., via a GUI or other suitable manner of presentation).

The encryption and/or decryption by messaging client 201-1 and/or messaging client 201-2 may be performed using a symmetric key that is generated based on a double ratchet technique, a Signal Protocol technique, and/or other suitable technique. For example, as discussed herein, the symmetric key may be used by a sender (e.g., UE 101-1, in this example) to encrypt a communication, and may be used by a recipient (e.g., UE 101-2, in this example) to decrypt the communication. The symmetric keys may be generated by respective Send Key Derivation Function ("KDF") 205 and/or Receive KDF 207 associated with the sender and/or recipient. The symmetric keys may be generated based on one or more root keys provided by Root KDF 203 to Send KDF 205 and/or Receive KDF 207. For example, Root KDF 203-1 may provide a root key output based on a public key and a private key to Send KDF 205-1, which may generate a send key (e.g., based on the root key output and one or more private keys)s which may be used to encrypt communications to be sent by messaging client 201-1. The private key based on which the root key output is generated may be privately maintained by UE 101-1 (e.g., not sent to UE 101-2), while the public key may be shared with UE 101-2 via private blockchain system 109, in accordance with embodiments described herein. Root KDF 203-1 may provide a different root key output for each message sent and/or received by messaging client 201-1, based on a public key exchange (e.g., via a Diffie-Hellman key exchange or other suitable procedure) with UE 101-2, which may be performed each time a message is sent by UE 101-1 and/or UE 101-2.

For example, when UE 101-1 sends a message, Root KDF 203-1 may generate a root key output, and may further output a public key based on which the root key output was generated, to private blockchain system 109. As discussed above, the public key may be provided with a session identifier (e.g., to identify a communication session between messaging client 201-1 and messaging client 201-2), an identifier associated with UE 101-1, an identifier associated with UE 101-2, and/or other suitable information based on which UE 101-2 may identify that the public key recorded to private blockchain system 109 is associated with the communication session between UE 101-1 and UE 101-2.

UE 101-2 (e.g., Root KDF 203-2) may obtain the root public key from private blockchain system 109 based on the session identifier or other suitable identifier, and may generate a root key output based on the obtained public key and a private key (e.g., a different private key than the private key used by Root KDF 203-1 to encrypt the communication). As noted above, using private blockchain system 109 to exchange public keys may maintain the integrity of the keys, such as by preventing malicious actors from modifying or "spoofing" keys. Further, using private blockchain system 109 may aid in situations where a given UE 101 (e.g., UE 101-2, in this example) is "offline" or is otherwise unavailable to receive public keys from another UE 101 (e.g., UE 101-1, in this example) at the time that the other UE 101 outputs the public keys.

Root KDF 203-2 may provide the root key output to Receive KDF 207-2, which may generate a receive key based on the root key output and one or more private keys. In accordance with the double ratchet techniques, Signal Protocol techniques, etc., the receive key generated by Receive KDF 207-2 may be the same as the send key output generated by Send KDF 205-1. In this manner, these respective send and receive keys may be an identical symmetric key that may be used to encrypt and decrypt communications, such as the encrypted communication sent by messaging client 201-1 to messaging client 201-2 in this example.

While an example is provided here in the context of UE 101-1 encrypting a communication, sending the encrypted communication to UE 101-2, and UE 101-2 decrypting the communication, similar techniques may be performed (e.g., iteratively) for communications encrypted and sent by UE 101-2 to UE 101-1, as denoted by the dashed lines in FIG. 2. For example, Root KDF 203-2 may generate a root key pair, output a public key of the root key pair to private blockchain system 109 for retrieval by UE 101-1, generate a root key output based on the root key pair, and provide the root key output to Send KDF 205-2. Send KDF 205-2 may generate a send key based on the root key output and one or more private keys, and messaging client 201-2 may encrypt a communication based on the send key. Further, Root KDF 203-1 may retrieve the public key from private blockchain system 109, generate a root key output based on the retrieved public key and one or more private keys, and provide the root key output to Receive KDF 207-1. Receive KDF 207-1 may generate a receive key based on the root key output and one or more private keys, and messaging client 201-1 may decrypt a communication received from messaging client 201-2, as encrypted based on a matching send key.

Figure 3:
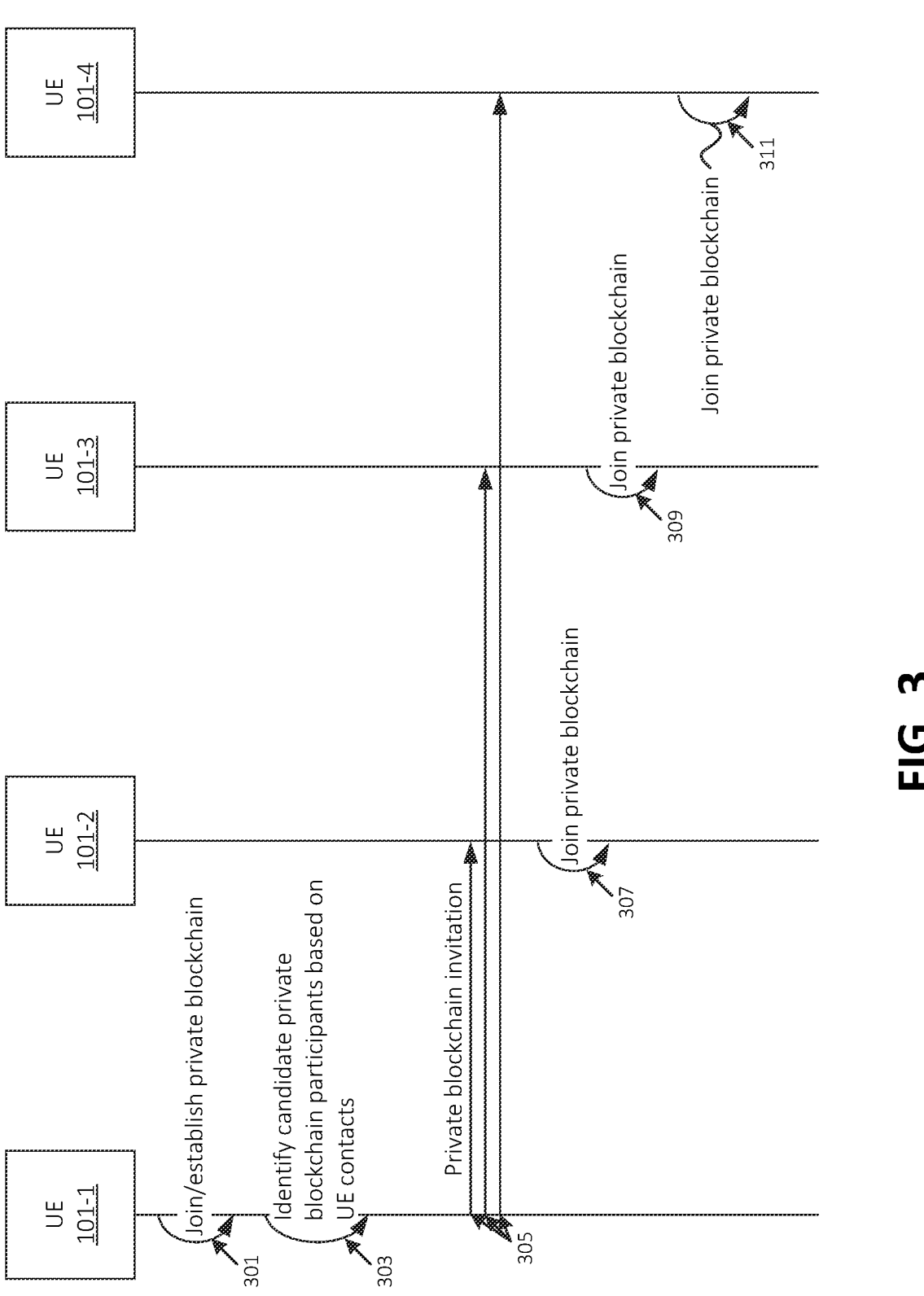
FIG. 3 illustrates an example of establishing a private blockchain system, in accordance with one or more embodiments.

As noted above, private blockchain system 109 may be a "private" blockchain, in that only approved UEs 101 (or other suitable devices or systems) may participate in private blockchain system 109 as nodes 111 of private blockchain system 109. In some embodiments, eligible participants may be identified based on an automated determination of contacts associated with one or more participant nodes 111 of private blockchain system 109, and/or some other suitable technique. For example, as shown in FIG. 3, UE 101-1 may establish (at 301) and/or join private blockchain system 109. For example, UE 101-1 may establish a new private blockchain system 109 by generating a "genesis" block, and/or may join an existing private blockchain system 109. In some embodiments, UE 101-1 may communicate with one or more devices or systems that facilitate the establishment of private blockchain system 109.

UE 101-1 may further automatically identify (at 303) candidate participants (e.g., nodes 111 for private blockchain system 109, devices or systems that are authorized to access information stored in private blockchain system 109, or the like). For example, UE 101-1 may identify contacts in an address book, call history, and/or other type of contact list associated with UE 101-1. Additionally, or alternatively, UE 101-1 and/or some other device or system may utilize artificial intelligence/machine learning ("AI/ML") techniques or other suitable techniques to identify UEs 101 with which UE 101-1 has communicated.

UE 101-1 may output (at 305) an invitation to join (e.g., as a node 111 and/or as an authorized viewer of information stored in private blockchain system 109) to identified UEs 101-2, 101-3, and 101-4. In some embodiments, UE 101-1 (e.g., an application or application programming interface ("API") associated with UE 101-1) may communicate with contacts in a contact list associated with UE 101-1 (e.g., where the contacts include UEs 101-2, 101-3, and 101-4 in this example) via one or more suitable messaging or other types of communication applications, and may identify particular ones of the contacts participate in a key escrow or other type of key exchange. UE 101-1 may output an invitation to private blockchain system 109 to the identified contacts via the messaging or other communication applications and/or some other suitable communication pathway. In some embodiments, the invitation may include identifying information associated with UE 101-1, such as an IP address associated with UE 101-1, an MDN associated with UE 101-1, an IMEI value associated with UE 101-1, an IMSI value associated with UE 101-1, and/or some other suitable identifier.

UEs 101-2, 101-3, and 101-4 may accordingly join (at 307, 309, and 311, respectively) private blockchain system 109. For example, such UEs 101-2, 101-3, and 101-4 may register as nodes 111 using information provided (at 305) by UE 101-1, and/or may access information stored in private blockchain system 109 using such information. In this manner, private blockchain system 109 may be "private" inasmuch as UEs 101 which were not invited (at 305) to private blockchain system 109 may not access the information stored in private blockchain system 109.

Figure 4:
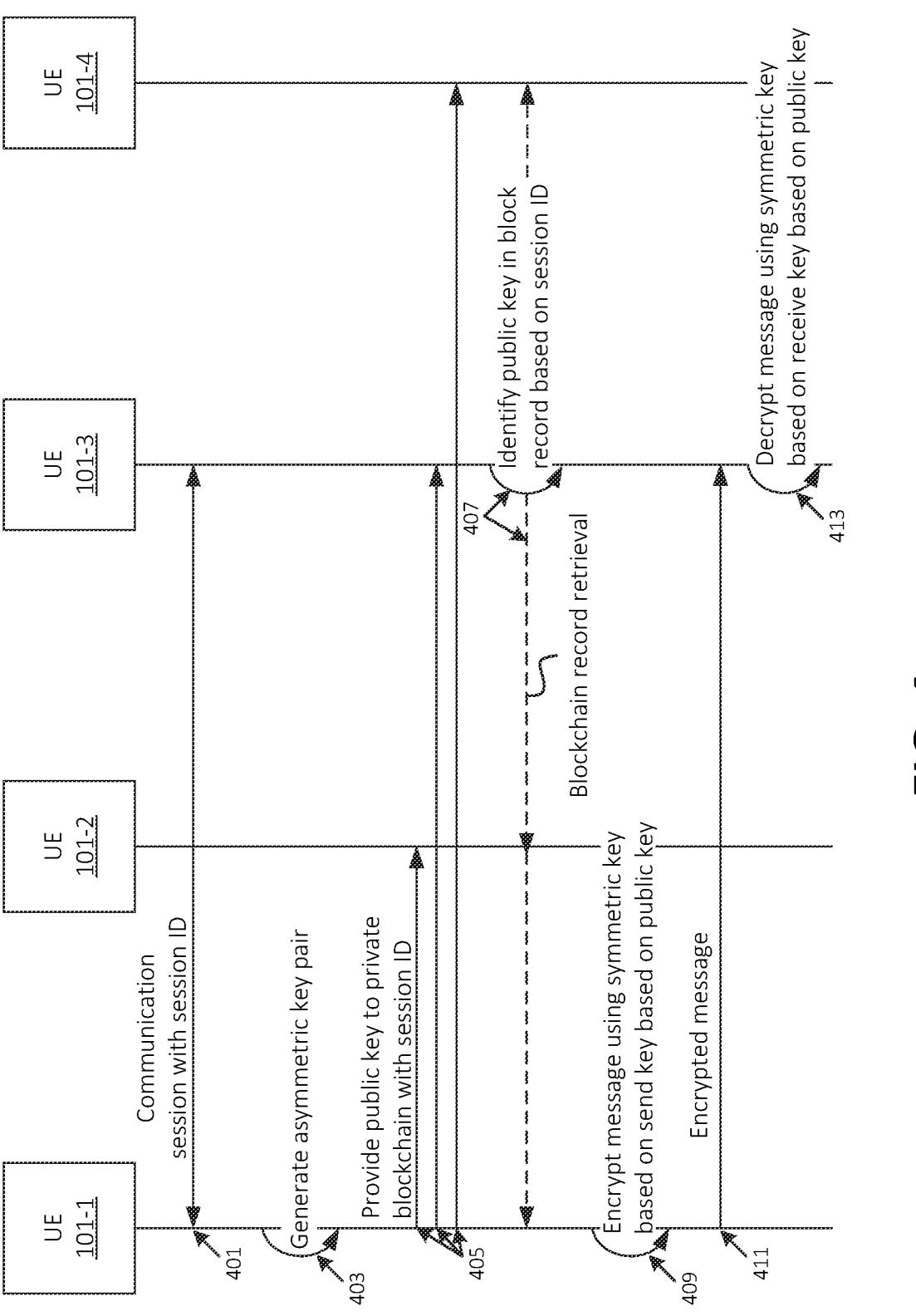
FIG. 4 illustrates an example of using a shared public key via a private blockchain system, in accordance with some embodiments, in a communication that utilizes double ratchet techniques to secure communications.

FIG. 4 illustrates an example of the use of private blockchain system 109 to exchange public keys in the encryption and/or decryption of secure communications between UEs 101 participating in a secure communication session. In this example, UEs 101-1, 101-2, 101-3, and 101-4 may be nodes 111 of private blockchain system 109. Further, UEs 101-1 and 101-3 may be participants in a communication session (e.g., via respective messaging clients 201 associated with UEs 101-1 and 101-3). For example, UE 101-1 and UE 101-3 may establish (at 401) a secure communication session using any suitable session establishment technique or protocol. The communication session may be associated with a session identifier or other suitable mechanism by which UEs 101-1 and/or 101-3 may identify the communication session. For example, an initiator of the communication session may generate or otherwise determine an identifier for the communication session, and/or UEs 101-1 and 101-3 may otherwise negotiate or determine an identifier for the communication session.

UE 101-1 may further generate (at 403) an asymmetric key pair, which may be used as part of a double ratchet technique, a Signal Protocol technique, and/or some other encryption technique used to secure communications between UEs 101-1 and 101-3. For example, the asymmetric key pair generated (at 403) by UE 101-1 may include a public key used in the generation of a send key used to encrypt communications sent to UE 101-3. While not explicitly shown in FIG. 4, UE 101-3 may also generate one or more keys that may be used in the encryption and/or decryption of messages between UEs 101-1 and 101-3, in accordance with the double ratchet technique, Signal Protocol technique, and/or other suitable encryption technique.

UE 101-1 may further provide (at 405) the public key of the generated asymmetric key pair to private blockchain system 109. As noted above, UEs 101-1, 101-2, 101-3, and 101-4 may be nodes 111 of private blockchain system 109. In other examples, UE 101-3 (e.g., a participant in the secure communication session) may not be a node 111 of private blockchain system 109, and thus UE 101-1 may not directly provide (at 405) the public key to UE 101-3. When providing (at 405) the public key to private blockchain system 109, UE 101-1 may include the session identifier of the communication session between UEs 101-1 and 101-3, and/or some other suitable identifier based on which UE 101-3 may identify (at 407) the public key provided by UE 101-1.

For example, as discussed above, UE 101-3 may retrieve (at 407) the public key from private blockchain system 109 based on identifying a record in private blockchain system 109 that includes the session identifier or other suitable identifier associated with UEs 101-1 and/or 101-3. In situations where multiple blocks exist with the session identifier, UE 101-3 may identify a latest (e.g., newest) block. For example, in accordance with the double ratchet and/or Signal Protocol techniques, a new public key may be provided each time a message is sent and/or received by UE 101-1 and/or UE 101-3. As such, identifying a latest public key associated with the communication session between UEs 101-1 and 101-3 may facilitate the secure communications according to the double ratchet and/or Signal Protocol techniques.

UE 101-1 may further encrypt (at 409) a message for UE 101-3 using a symmetric key (e.g., a send key, as similarly discussed above) that UE 101-1 generates based on the public key, one or more private keys, and/or one or more KDFs (e.g., Send KDF 205). UE 101-1 may proceed to output (at 411) the encrypted message to UE 101-3. UE 101-3 may decrypt (at 413) the message using a symmetric key (e.g., the same symmetric key as UE 101-1 used to encrypt (at 409) the message), which may be generated by one or more KDFs (e.g., Receive KDF 207) based on the retrieved (at 407) public key.

While FIG. 4 shows an example of one message being sent from UE 101-1 to UE 101-3, similar techniques may be employed when UE 101-1 sends additional messages to UE 101-3, and/or when UE 101-3 sends messages to UE 101-1. For example, UE 101-3 may generate a subsequent asymmetric key pair that is derived from and/or is otherwise based on the retrieved (at 407) public key, and may output a public key of the subsequent asymmetric key pair to private blockchain system 109. UE 101-3 may utilize this subsequently generated public key to generate a send key, and UE 101-1 may utilize this subsequently generated public key, retrieved from private blockchain system 109, to generate a receive key, as described above.

Figure 5:
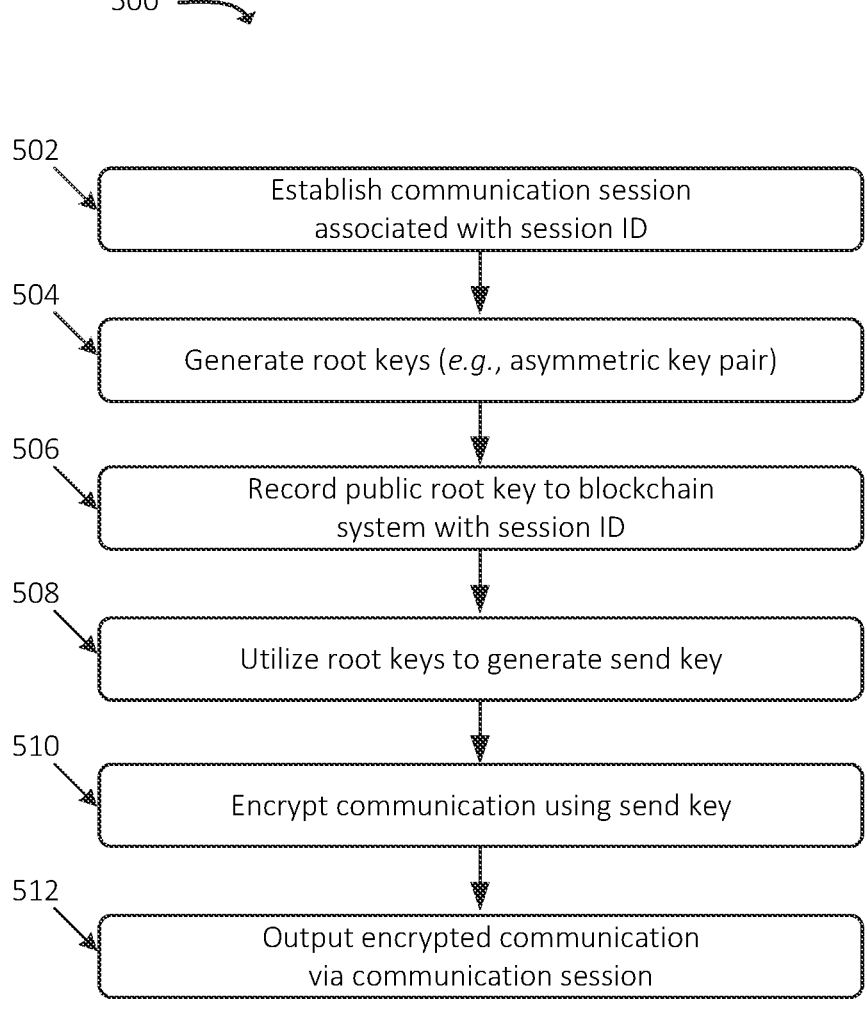

FIGS. 5 and 6 illustrate example processes 500 and 600, respectively, for utilizing blockchain techniques to share and/or exchange public keys. In the examples provided herein, the key exchange may be part of a Diffie-Hellman key exchange, a key exchange portion of a Signal Protocol technique, a key exchange portion of a double ratchet technique, and/or some other suitable secure exchange of public keys. In some embodiments, some or all of processes 500 and/or 600 may be performed by one or more UEs 101 (e.g., UEs 101 engaged in a communication session with each other and/or one or more other UEs 101). In some embodiments, one or more other devices may perform some or all of processes 500 and/or 600 in concert with, and/or in lieu of, UE 101.

As shown, process 500 may include establishing (at 502) a communication session with one or more UEs 101. The communication session may be associated with a session identifier or other identifier based on which participant UEs 101 of the communication session may identify messages exchanged with one another and/or public keys, associated with the communication session, recorded to private blockchain system 109 in accordance with embodiments described herein.

Process 500 may further include generating (at 504) a set of root keys, which may include an asymmetric key pair. For example, as discussed above, the root keys may include a private key which may be maintained securely by UE 101, and a public key which may ultimately be shared with one or more other UEs 101 (e.g., another participant in the communication session).

Process 500 may additionally include recording (at 506) the public root key (e.g., the public key of the asymmetric key pair generated at 504) to private blockchain system 109. For example, UE 101 may output the public key to private blockchain system 109, and private blockchain system 109 may propagate the information to one or more nodes 111 of private blockchain system 109. Nodes 111 may form a consensus regarding the addition of the provided public key to one or more records of private blockchain system 109, and may maintain an immutable record of the provided public key. In some embodiments, the record may include a timestamp, a block identifier, and/or other mechanism by which a recency or age of the record may be determined. As similarly described above, the record may further include a communication session identifier, an identifier of UE 101 from which the information was received, and/or other suitable information.

Process 500 may also include utilizing (at 508) the root keys to generate a send key. For example, as discussed above, Root KDF 203 may utilize the root keys (e.g., including the root public key, as well as the root private key and/or one or more other keys) to generate a root key output, and may provide the root key output to another KDF, such as Send KDF 205. Send KDF 205 may generate a send key based on the root key output from Root KDF 203 and/or based on one or more other keys or functions. As discussed above, the generated send key may be a symmetric key that may be identical to a receive key generated by a recipient of the public key, based on a Signal Protocol technique, a double ratchet technique, etc.

Process 500 may further include encrypting (at 510) a communication using the send key. Process 500 may additionally include outputting (at 512) the encrypted communication via the communication session, such as to a UE 101 with which the communication session was established (at 502).

As shown in FIG. 6, process 600 may include establishing (at 602) a communication session. For example, as similarly discussed above, UE 101 may establish a communication session with one or more other UEs 101. The communication session may be associated with a suitable identifier, based on which the UEs 101 participating in the communication session may identify communications associated with the communication session, including encrypted messages, public keys, and/or other information.

Process 600 may further include receiving (at 604) an encrypted communication via the communication session. For example, the communication may have been encrypted using one or more KDFs, where the input to the one or more KDFs include the public root key and one or more other keys (e.g., one or more private keys, one or more KDF outputs, etc.).

Process 600 may further include retrieving (at 606) a public root key from private blockchain system 109. In some embodiments, private blockchain system 109 and/or one or more devices or systems communicatively coupled to private blockchain system 109 may "push" the public root key to private blockchain system 109. For example, the one or more devices or systems may identify a particular block that includes an identifier of UE 101 (e.g., where the particular block includes the identifier of UE 101 and a public root key), may identify a particular block that includes an identifier of the communication session (e.g., where the particular block includes the identifier of the communication session and a public root key), etc. Additionally, or alternatively, UE 101 may "pull" the information from private blockchain system 109 based on a suitable identifier (e.g., an identifier of UE 101, an identifier of the communication session, etc.).

Process 600 may additionally include utilizing (at 608) the public root key to generate a receive key. For example, as discussed above, UE 101 may utilize one or more KDFs, such as Root KDF 203 and/or Receive KDF 207, to generate a receive key. The receive key may be a symmetric key with respect to a key used to encrypt a communication received by UE 101 via the communication session. For example, as discussed above, the receive key may be identical to a send key used by a sender of the communication, where the send key was also generated based on one or more KDFs and at least the public root key. For example, the sender and UE 101 may perform double ratchet techniques, Signal Protocol techniques, or the like, to respectively encrypt and decrypt the communication, without transmitting or sharing the symmetric key itself.

Process 600 may further include decrypting (at 610) the communication, received via the communication session, using the generated receive key. For example, UE 101 may apply one or more functions to decrypt the receive message using the receive key, which, as discussed above, may be the same as a send key used to encrypt the communication.

Process 600 may additionally include generating (at 612) a new set of root keys based on the previously retrieved public root key and one or more other root keys. For example, once UE 101 generates the receive key, the public root key (retrieved at 606) may be discarded and/or not used for sending messages from UE 101. In some situations, UE 101 may maintain the public root key and apply techniques described above to decrypt subsequent communications from the sender in situations where the sender sends multiple communications in a row without any intervening messages from UE 101. The new set of root keys may be generated based on the receive key (generated at 608), the public root key (retrieved at 606), and/or one or more other suitable keys. UE 101 may then proceed to output the newly generated public root key to private blockchain system 109, as similarly described above with respect to operation 506 of process 500, may generate (e.g., similar to operation 508) a new send key based on the newly generated public root key, etc.

Situations may arise in which the recordation or retrieval of information, such as a public root key used in a double ratchet technique, a public key associated with an asymmetric key pair (e.g., public key 107 associated with asymmetric key pair 103), and/or other suitable information is unsuccessful. For example, one or more nodes 111 of a distributed ledger, such as private blockchain system 109, may be "offline" or otherwise unreachable, such that a quorum (e.g., threshold minimum quantity of nodes 111) are not available to securely record data and/or are not available to confirm, cross-validate, etc. data that has been previously recorded to the distributed ledger. Embodiments described herein provide for the use of a key escrow system to enhance the robustness of the blockchain-based key storage and retrieval discussed above, in order to provide for situations in which private blockchain system 109 is inaccessible or is otherwise unable to be used for key storage and/or retrieval.

Figure 7:
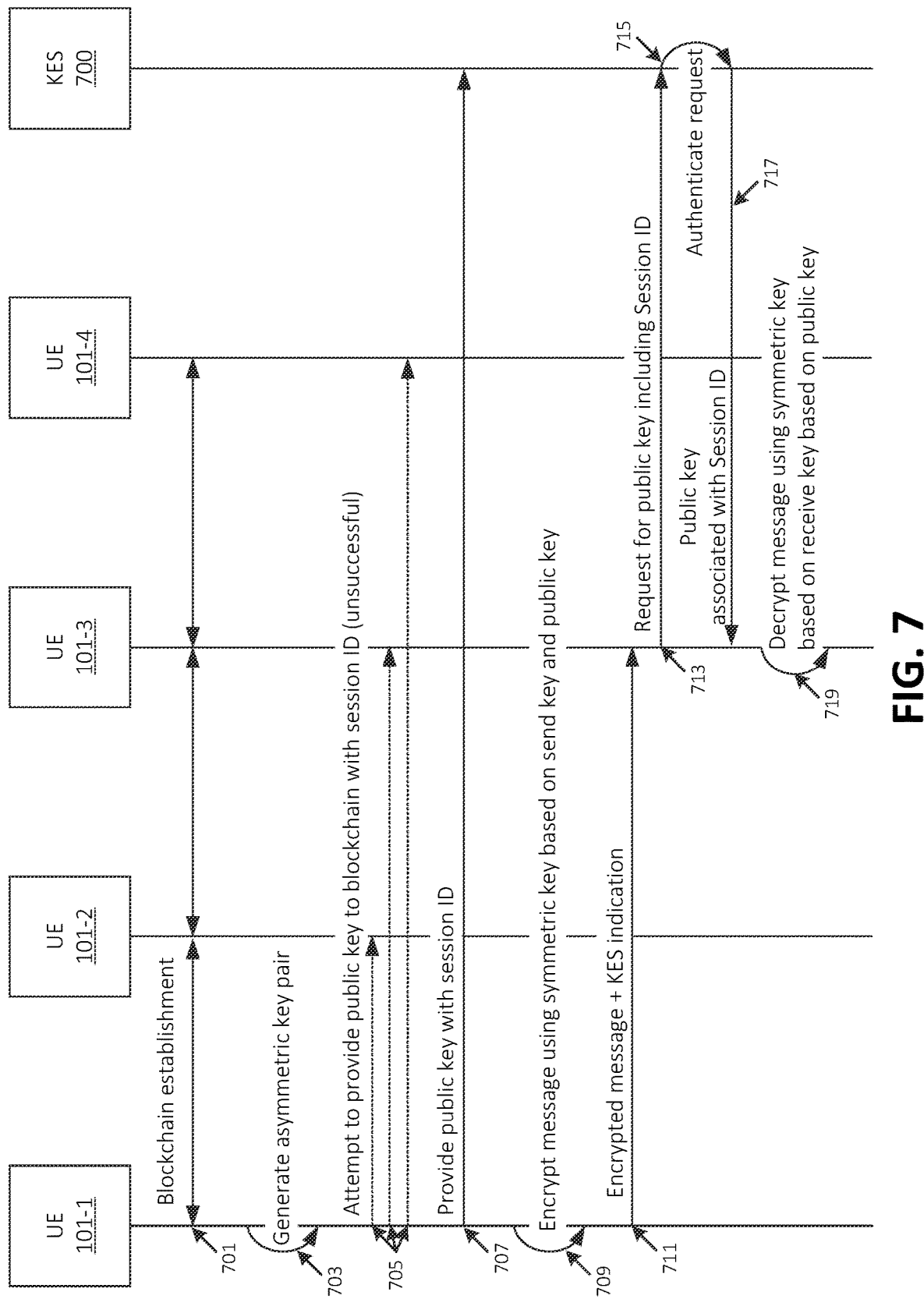
FIGS. 7-10 illustrate an example of using a key escrow fallback in situations where public key retrieval via a blockchain is unsuccessful, in accordance with some embodiments.

For example, referring to FIG. 7, assume that UEs 101-1 and 101-3 are engaged in a communication session, in which UE 101-1 may send and/or receive one or more messages to and/or from UE 101-3, such as messages encrypted using one or more keys as discussed above. UEs 101-1 through 101-4 may participate (at 701) in a blockchain establishment procedure, in which UEs 101-1 through 101-4 are each registered as nodes 111 associated with a particular private blockchain system 109 (e.g., where the particular private blockchain system 109 is associated with the communication session between UEs 101-1 and 101-3).

UE 101-1 may generate (at 703) an asymmetric key pair, which may be used as part of a double ratchet technique, a Signal Protocol technique, and/or some other encryption technique used to secure communications between UEs 101-1 and 101-3. For example, the asymmetric key pair generated (at 703) by UE 101-1 may include a public key used in the generation of a send key used to encrypt communications sent to UE 101-3. While not explicitly shown in FIG. 7, UE 101-3 may also generate one or more keys that may be used in the encryption and/or decryption of messages between UEs 101-1 and 101-3, in accordance with the double ratchet technique, Signal Protocol technique, and/or other suitable encryption technique. As similarly discussed above, the communication session between UEs 101-1 and 101-3 may be associated with a session identifier, which may be used by UE 101-1, UE 101-3, and/or one or more other suitable devices or systems to identify the communication session between UEs 101-1 and 101-3.

As further shown, UE 101-1 may attempt (at 705) to provide a public key, associated with the asymmetric key pair (generated at 703), to the established (at 701) private blockchain system 109. UE 101-1 may additionally attempt (at 705) to provide the session identifier associated with the communication session, in conjunction with the public key.

For example, UE 101-1 may attempt to provide the public key to UEs 101-2, 101-3, and/or 101-4. In this example, the attempt to provide the public key to one or more of UEs

101-2, 101-3, and/or 101-4 may be unsuccessful. For example, one or more of such UEs 101 may be powered down, may be located in a region with degraded wireless connectivity, may be malfunctioning, and/or may otherwise be inaccessible or unreachable. UE 101-1 may identify the unsuccessful attempt to provide the public to one or more nodes 111 of private blockchain system 109 (e.g., UEs 101-2, 101-3, and/or 101-4) via a lack of confirmation messages from such nodes 111 (e.g., where each node 111 may confirm the receipt and/or recordation of the public key to private blockchain system 109), and/or in some other suitable manner.

Additionally, or alternatively, UE 101-1 may identify the unsuccessful attempt based on one or more failure messages, rejection messages, etc. from one or more nodes 111. For example, situations may arise in which one or more nodes 111 (e.g., UE 101-2, UE 101-3, and/or UE 101-4) receive (at 705) a request, instruction, etc. from UE 101-1 to record the public key to private blockchain system 109, but the quantity of nodes 111 receiving the request is below a threshold quantity of nodes 111 (e.g., a "quorum") associated with validating, confirming, etc. the recordation of information to private blockchain system 109. For example, private blockchain system 109 may be associated with a threshold quantity of three nodes 111 needed to confirm, validate, etc. the recordation of information, and only two nodes 111 may confirm, validate, etc. the provided (at 705) public key (e.g., within a particular threshold duration of time or a "time-out" duration, such as 30 seconds, one minute, etc.). In such a situation, the attempted modification to private blockchain system 109 (e.g., the recordation of the provided public key) may not be performed, and the nodes 111 that did receive the public key (at 705) from UE 101-1 may output a notification that private blockchain system 109 was not modified based on the attempt (at 705) by UE 101-1 to record the public key to private blockchain system 109.

Based on determining that the attempt to record the public key associated with the session identifier of the communication session between UEs 101-1 and 101-3 was unsuccessful, UE 101-1 may provide (at 707) the public key (e.g., including or in conjunction with the session identifier) to one or more off-chain systems, such as Key Escrow System ("KES") 700. In some embodiments, UEs 101-1 and/or 101-3 may have previously registered with KES 700, such as performing one or more authentication procedures in which KES 700 is able to securely identify and/or authenticate UEs 101-1 and/or 101-3. Additionally, or alternatively, KES 700 may include or implement one or more other suitable mechanisms by which one or more keys (e.g., public keys according to the examples described herein and/or other keys or data) may be securely provided and/or retrieved by one or more suitable entities. For example, when providing (at 707) the public key, UE 101-1 may further provide a password, a randomly generated number, and/or some other value associated with some suitable authentication mechanism, to ensure that the public key may only be retrieved or otherwise accessed by an authorized entity (e.g., UE 101-3). In some embodiments, KES 700 may respond to UE 101-1 with a record identifier, index, or some other identifier associated with the storage, by KES 700, of the received public key. In some embodiments, KES 700 may communicate with UE 101-1, UE 101-3, and/or one or more other devices or systems via one or more APIs, portals, or other suitable communication pathways.

UE 101-1 may encrypt (at 709) a message, associated with the communication session between UE 101-1 and UE 101-3, using a symmetric key (e.g., a send key, as similarly discussed above) that UE 101-1 generates based on the public key, one or more private keys, and/or one or more KDFs (e.g., Send KDF 205). UE 101-1 may proceed to output (at 711) the encrypted message to UE 101-3. UE 101-1 may further provide an indication that the public key generated by UE 101-1 (e.g., which may be used by UE 101-3 to decrypt the message, such as using a double ratchet technique as discussed above) is available at KES 700. In some embodiments, the KES indication may include an address (e.g., a Uniform Resource Locator ("URL"), an IP address, etc.) or some other identifier of KES 700. In some embodiments, the KES indication may include a password, a randomly generated number, and/or some other value associated with a suitable authentication mechanism, as discussed above. In some embodiments, the KES indication may include an index, record identifier, etc. (e.g., as provided by KES 700 to UE 101-1 in some embodiments, as discussed above).

In some embodiments, the KES indication may be sent as metadata or other information that is included in, appended to, prepended to, etc. the encrypted message. Additionally, or alternatively, the KES indication may be sent as a separate message or set of messages from the encrypted message. In some embodiments, the KES indication may include an identifier of the encrypted message, a cryptographic hash of the encrypted message, a portion of the encrypted message, and/or some other suitable information linking the KES indication to the encrypted message.

Based on receiving the KES indication, UE 101-3 may output (at 713) a request for a public key associated with the communication session between UEs 101-1 and 101-3 (e.g., associated with the session identifier). For example, UE 101-3 may use the address, identifier, etc. of KES 700 included in the KES indication associated with the encrypted message received from UE 101-1. In some embodiments, UE 101-3 may provide an identifier of UE 101-3, authentication information included in or derived from the KES indication (e.g., a password, a randomly generated number, etc.), and/or other suitable information based on which KES 700 may authenticate (at 715) UE 101-3 and/or the request from UE 101-3. Additionally, or alternatively, KES 700 may forgo authenticating (at 715) UE 101-3.

KES 700 may provide (at 717) the public key to UE 101-3, in response to the request (at 713). For example, after authenticating the request (715), KES 700 may provide the requested public key. In embodiments where KES 700 does not perform the authentication (at 715) of UE 101-3, KES 700 may provide (at 717) the requested public key without authenticating UE 101-3 (e.g., KES 700 may provide the public key to any requestor based on the session identifier, in such embodiments). UE 101-3 may decrypt (at 719) the message using a symmetric key (e.g., the same symmetric key as UE 101-1 used to encrypt (at 709) the message), which may be generated by one or more KDFs (e.g., Receive KDF 207) based on the retrieved (at 713-717) public key.

Figure 8:
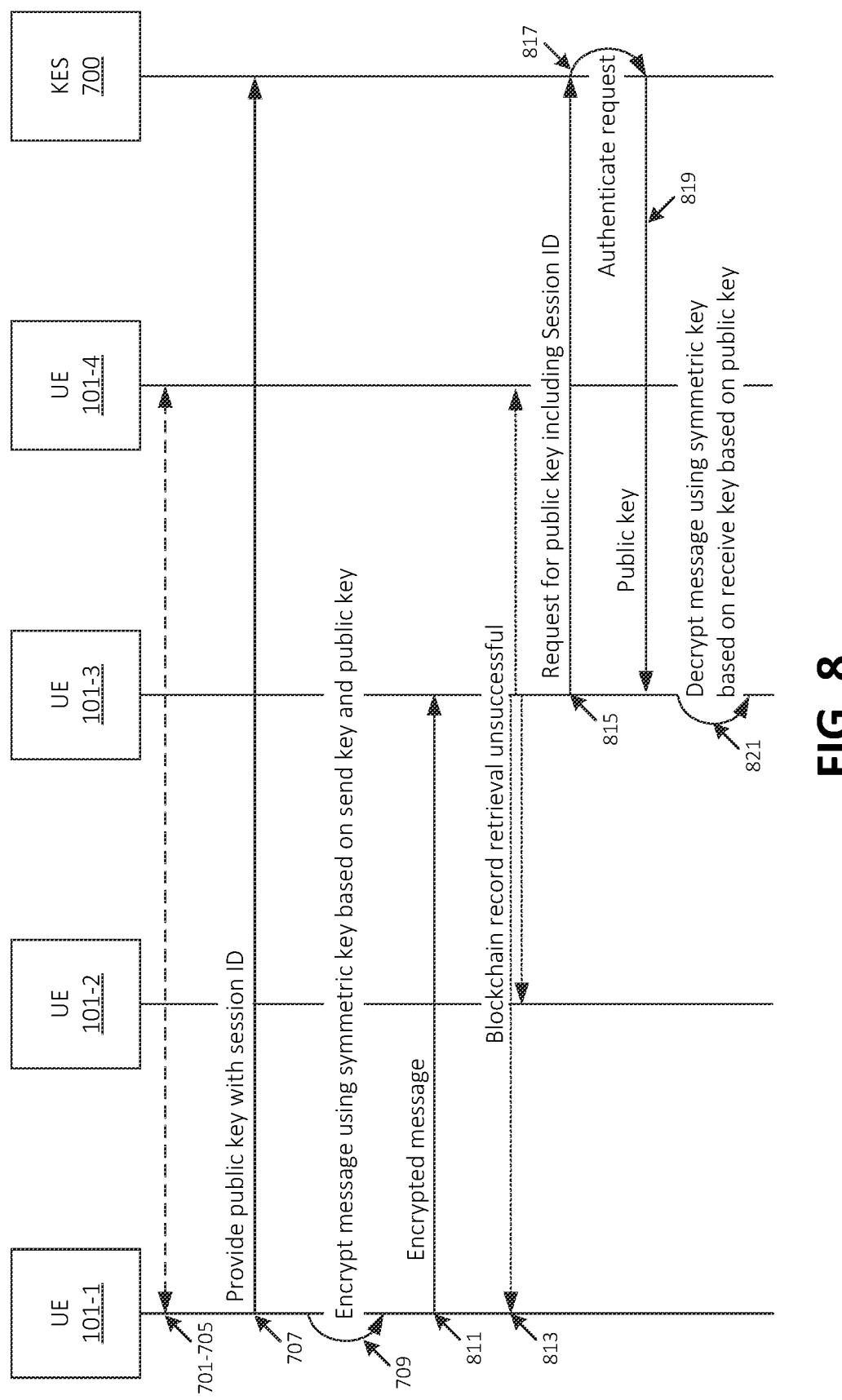

FIG. 8 illustrates another example of using KES 700 to enhance the robustness of distributed ledger-based key distribution and retrieval. For example, after establishing (at 701) private blockchain system 109, generating (at 703) an asymmetric key pair, unsuccessfully attempting (at 705) to record the public key to private blockchain system 109, providing (at 707) the public key to KES 700, and encrypting (at 709) the message, UE 101-1 may output (at 811) the encrypted message to UE 101-3 without an indication that the key should be retrieved from KES 700.

UE 101-3 may attempt (at 813) to retrieve a record from private blockchain system 109 (e.g., from nodes 111 of private blockchain system 109, such as UEs 101-1, 101-2, and/or 101-4) that includes a public key associated with UE 101-1 and/or the session identifier of the communication session between UEs 101-1 and 101-3. For example, UE 101-3 may attempt to retrieve the record based on receiving the encrypted message from UE 101-1. In this example, the retrieval may be unsuccessful. For example, some or all of UEs 101-1, 101-2, and/or 101-4 may be offline, may be powered down, and/or may otherwise not respond to one or more communications from UE 101-3. Such communications may include a request to provide records associated with private blockchain system 109, such as a record that includes a public associated with the communication session between UEs 101-1 and 101-3.

Additionally, or alternatively, UE 101-3 may be able to communicate with some or all of the nodes 111 of private blockchain system 109, such as UEs 101-1, 101-2, and 101-4, but the public key may not have been recorded to private blockchain system 109. In this example, as noted above, UE 101-1 may have attempted (at 705) to record the public key to private blockchain system 109, but the attempt to record the public key may have been unsuccessful. As such, even if UE 101-3 is able to communicate with all of the nodes 111 of private blockchain system 109, the requested information (e.g., the public key generated by UE 101-1) may not be available on private blockchain system 109.

Based on the unsuccessful attempt (at 813) to retrieve the public key from private blockchain system 109, UE 101-3 may request (at 815) the public key from KES 700. For example, UEs 101-1 and 101-3 (e.g., associated with a particular communication session) may have previously been registered or configured to communicate with KES 700 in the event that a public key associated with the communication session is not available on private blockchain system 109. Such registration may, in some embodiments, include establishing one or more authentication mechanisms, via which KES 700 maintains information that securely associates UEs 101-1 and/or 101-3 with the particular communication session (e.g., with a session identifier of the communication session). As such, the request (at 815) may include the session identifier, an identifier of UE 101-1 and/or 101-3, and/or other suitable information based on which KES 700 may identify the particular public key that is being requested (e.g., in situations where KES 700 concurrently maintains keys associated with multiple different communication sessions) and/or may authenticate (at 817) UE 101-3.

KES 700 may accordingly provide (at 819) the requested public key to UE 101-3, which may decrypt (at 821) the message using the public key. For example, as discussed above, UE 101-3 may use a double ratchet technique or other suitable technique to decrypt the message.

Figure 9:
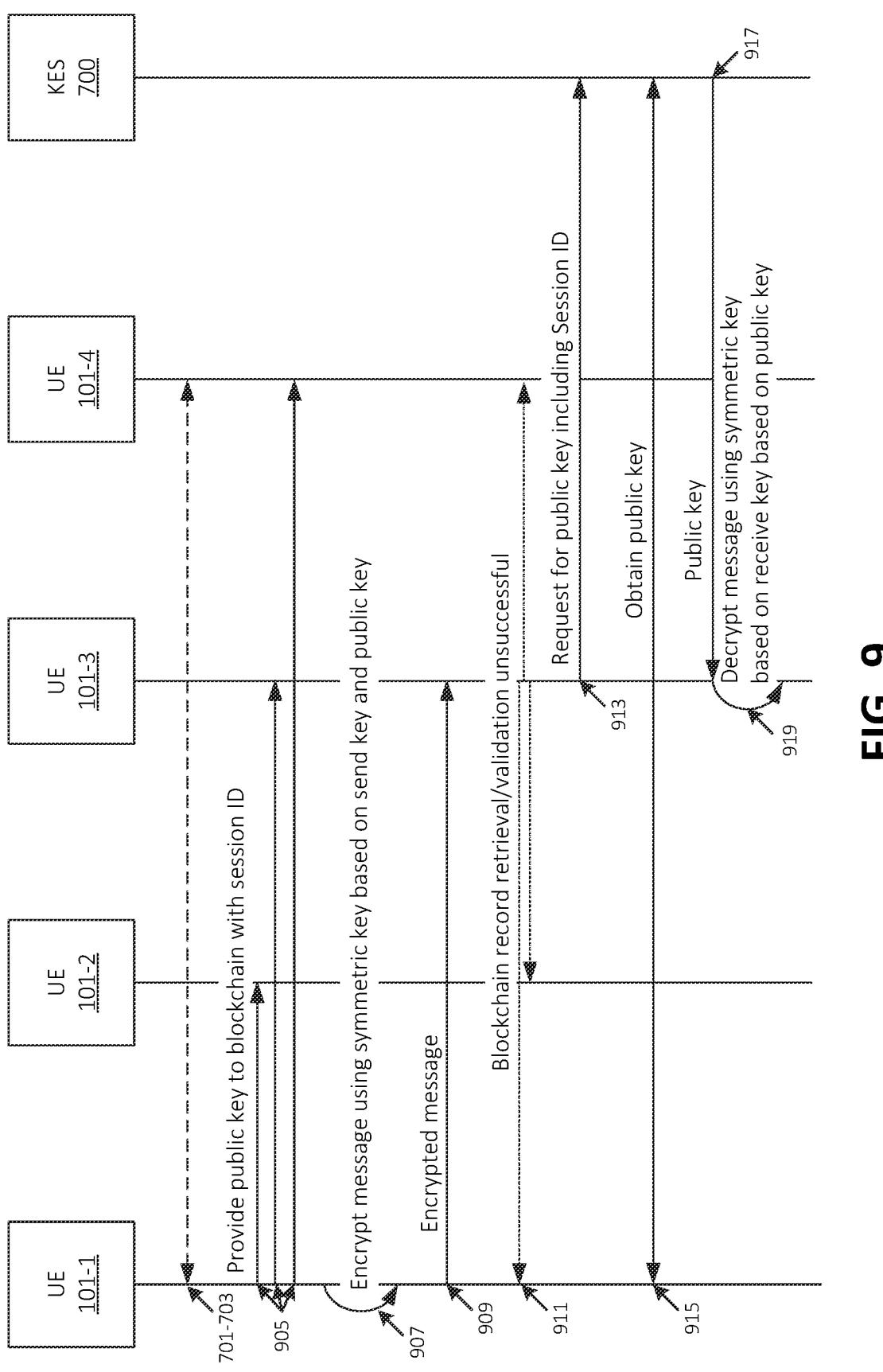

Situations may arise in which information (e.g., a public key in accordance with example messaging protocols discussed above) is successfully recorded to private blockchain system 109, but then is unable to be retrieved or validated after the recordation of the information. As shown in FIG. 9, KES 700 may serve as a fallback for private blockchain system 109 in such situations. As shown, for example, UE 101-1 may provide (at 905) a public key (e.g., as generated at 703) to private blockchain system 109 (e.g., by communicating with one or more nodes 111 of private blockchain system 109, such as UEs 101-2, 101-3, and 101-4). The recordation may be successful, in that UE 101-1 may receive confirmation from one or more nodes 111 of private blockchain system 109 that the public key was recorded to private blockchain system 109. UE 101-1 may accordingly encrypt (at 907) an outgoing message associated with a communication session between UEs 101-1 and 101-3, and send (at 909) the encrypted message to UE 101-3.

UE 101-3 may attempt (at 911) to retrieve the public key associated with the communication session between UEs 101-1 and 101-3 from private blockchain system 109, but the attempt may be unsuccessful. For example, some or all of UEs 101-1, 101-2, and/or 101-4 may be powered down, offline, and/or may otherwise be unreachable by UE 101-3. As such, UE 101-3 may be unable to retrieve the public key from private blockchain system 109, and/or may be unable to validate (e.g., cross-validate) the public key. For example, UE 101-3 may be able to retrieve the public key from one or more nodes 111 of private blockchain system 109, but may not be able to retrieve the public key from enough nodes 111 (e.g., at least a threshold quantity of nodes 111) to satisfy one or more cross-validation policies. A cross-validation policy may specify a quantity, percentage, etc. of nodes 111 from which a record is to be retrieved in order for the record to be considered valid.

Based on the unsuccessful retrieval and/or validation (at 911) of the public key associated with the communication session between UEs 101-1 and 101-3, UE 101-3 may request (at 913) the public key from KES 700. UEs 101-1 and 101-3 may have previously registered with KES 700 as part of establishing the communication session, and/or one or more other devices or systems may have provided information regarding the communication session to KES 700. In this manner, KES 700 may maintain information associating UEs 101-1 and 101-3 with the communication session. Such information may include a communication session identifier, IP addresses, IMSI values, IMEI values, MDN values, and/or other identifiers associated with UEs 101-1 and 101-3 and/or the communication session. Additionally, or alternatively, the request (at 913) may include one or more identifiers of UE 101-1. In some embodiments, the request (at 913) may include an identifier of UE 101-3 and/or other suitable information based on which KES 700 may authenticate UE 101-3 and/or the request (at 913) from UE 101-3. Additionally, or alternatively, KES 700 may forgo authenticating UE 101-3.

Based on the request (at 913), KES 700 may obtain (at 915) the public key from UE 101-1. For example, KES 700 may identify UE 101-1 based on information associating UEs 101-1 and 101-3 with the particular communication session, based on an identifier of UE 101-1 included in the request (at 913) from UE 101-3, and/or in some other suitable manner. In some embodiments, UE 101-1 may authenticate the request from KES 700 prior to providing the public key to KES 700. In some embodiments, such authenticating may include communicating with KES 700 via one or more APIs and/or otherwise authenticating the request from KES 700. KES 700 may accordingly provide (at 917) the requested public key to UE 101-3, which may decrypt (at 919) the message received (at 909) from UE 101-1 based on the received public key and/or one or more other keys, as discussed above.

Figure 10:
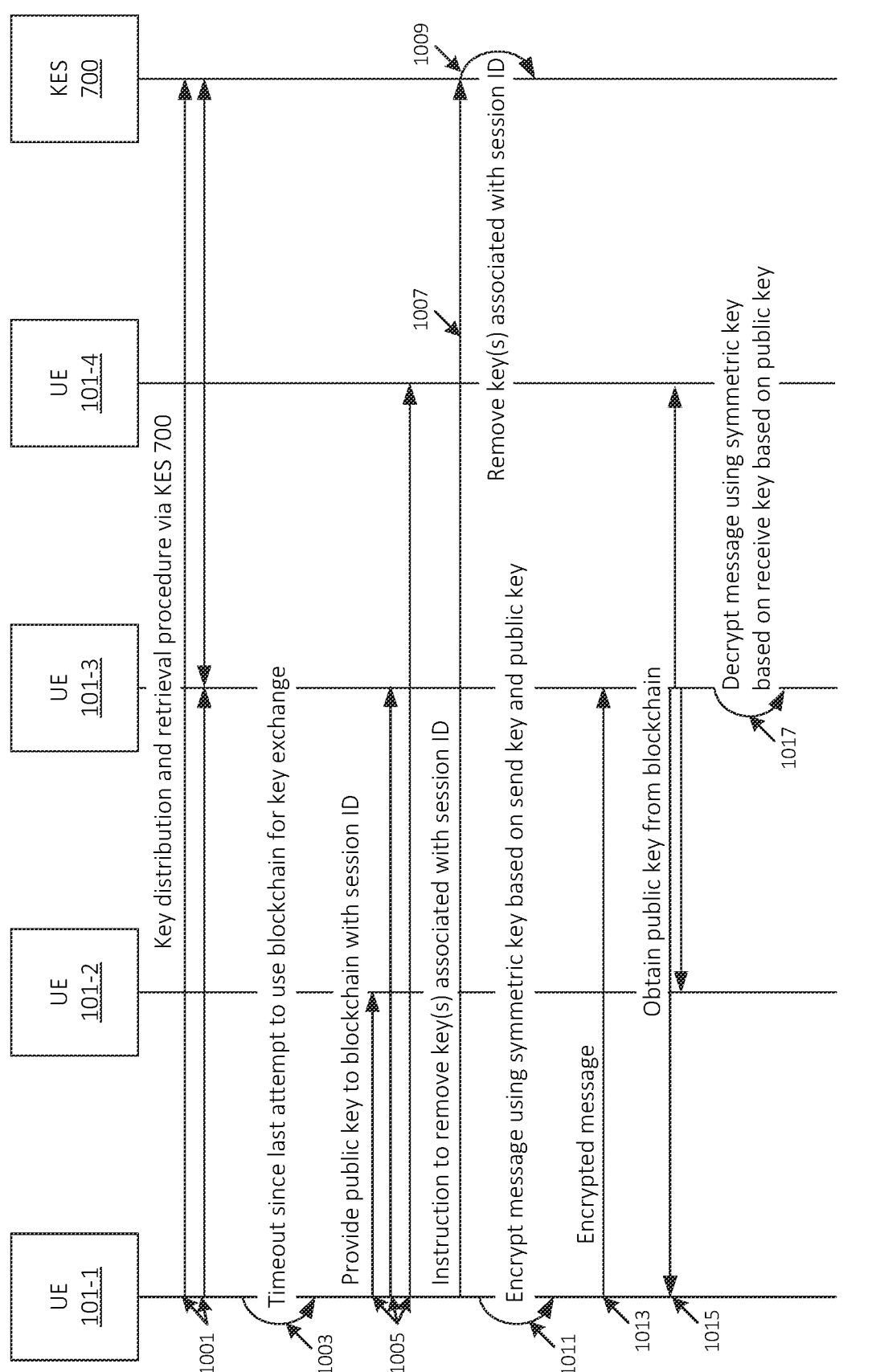

When using KES 700 as a fallback for key distribution and/or retrieval from private blockchain system 109, UEs 101 involved in a communication session (e.g., UEs 101-1 and 101-3, in the examples provide herein) may utilize one or more timers or other suitable mechanisms to return to using private blockchain system 109 for key distribution and/or retrieval. As shown in FIG. 10, UEs 101-1 and 101-3 may be involved in a communication session, and may be providing and/or retrieving public keys associated with the communication session via KES 700, in a manner described above. For example, UE 101-1 may provide public keys to KES 700 (e.g., may "push" the keys to KES 700 or may provide the keys to KES 700 in response to one or more requests from KES 700, as discussed above) for retrieval by UE 101-3, and vice versa. In some embodiments, in situations where attempts to record public keys to private blockchain system 109 (e.g., at 705) and/or to retrieve public keys from private blockchain system 109 (e.g., at 813 and/or 911) are unsuccessful, UEs 101-1 and 101-3 may refrain from attempting to record and/or retrieve public keys to and/or from private blockchain system 109 for a particular duration (e.g., 30 minutes, one hour, six hours, etc.). As such, when communicating with each other during such duration, UEs 101-1 and 101-3 may provide and/or retrieve (at 1001) public keys to and/or from KES 700. That is, in some embodiments, during this duration, UEs 101-1 and 101-3 may refrain from attempting to access private blockchain system 109 for the exchange of public keys.

After the threshold duration of time has passed, elapsed, timed out, etc. (at 1003), UEs 101-1 and/or 101-3 may once again attempt to utilize private blockchain system 109 for the exchange of public keys associated with the communication session between UEs 101-1 and 101-3. For example, for the next public key generated by UE 101-1 after the timeout (at 1003), UE 101-1 may provide (at 1005) the public key to private blockchain system 109 (e.g., to nodes 111 such as UEs 101-2, 101-3, and 101-4). In this example, assume that the recordation (at 1005) to private blockchain system 109 was successful. In other situations, the recordation to private blockchain system 109 may be unsuccessful, based on which UE 101-1 may restart the timer before again attempting to record a public key to private blockchain system 109. This timer may be the same duration as the previous timer, or may be a different duration (e.g., shorter or longer) based on the consecutive unsuccessful attempt.

Based on the successful recordation (at 1005) of the public key to private blockchain system 109, UE 101-1 may instruct (at 1007) KES 700 to remove one or more previously provided (at 1001) keys associated with the communication session between UEs 101-1 and 101-3. KES 700 may accordingly remove (at 1009) the indicated keys, which may include deleting the keys and/or otherwise making the keys unavailable for access or retrieval by UEs 101 and/or other devices or systems.

As similarly discussed above, UE 101-1 may accordingly encrypt (at 1011) a message for UE 101-3 using the public key provided (at 1005) to private blockchain system 109, and may output (at 1013) the encrypted message to UE 101-3. UE 101-3 may obtain (at 1015) the public key from private blockchain system 109, and may decrypt (at 1017) the message using the obtained public key and/or one or more other keys (e.g., as discussed above).

FIG. 11 illustrates an example process 1100 for utilizing KES 700 as a fallback for private blockchain system 109 for a key distribution procedure, in accordance with some embodiments. In some embodiments, some or all of process 1100 may be performed by one or more UEs 101 (e.g., UEs 101 engaged in a communication session with each other and/or one or more other UEs 101). In some embodiments, one or more other devices may perform some or all of process 1100 in concert with, and/or in lieu of, UE 101.

As shown, process 1100 may include establishing (at 1102) a communication session associated with a session identifier. As discussed above, the communication session may be associated with a session identifier or other identifier based on which participant UEs 101 of the communication session may identify messages exchanged with one another and/or public keys, associated with the communication session, recorded to private blockchain system 109 and/or KES 700 in accordance with embodiments described herein.

Process 1100 may further include registering (at 1104) with KES 700. For example, in some embodiments, the UEs 101 involved in the communication session may register with KES 700, implement one or more APIs or other communication pathways via which UEs 101 may communicate with KES 700, etc. In some embodiments, UEs 101 may forgo registering with KES 700.

Process 1100 may additionally include generating (at 1106) one or more root keys, which may include an asymmetric key pair. For example, as discussed above, the root keys may include a private key which may be maintained securely by UE 101, and a public key which may ultimately be shared with one or more other UEs 101 (e.g., another participant in the communication session).

Process 1100 may also include attempting (at 1108) to record the public root key (e.g., the public key of the asymmetric key pair generated at 1106) to private blockchain system 109. For example, UE 101 may output the public key to one or more nodes 111 of private blockchain system 109. UE 101 may determine that the attempt was unsuccessful, such as in situations where UE 101 does not receive a confirmation (e.g., within a threshold amount of time, such as one minute, 15 minutes, etc.) that the public key was recorded to private blockchain system 109, where UE 101 receives an indication that the public key was not recorded to private blockchain system 109 (e.g., a transaction failure), and/or in some other suitable manner.

Process 1100 may further include providing (at 1110) the public root key and the session identifier to KES 700 based on the unsuccessful attempt to record the public root key to private blockchain system 109. For example, UE 101 may provide the root key to KES 700 via an implemented API and/or other communication pathway between UE 101 and KES 700 (e.g., based on the registering (at 1104) of UE 101 with KES 700). Additionally, or alternatively, KES 700 may be a system in which prior registration is not required, and may receive and maintain the public root key and session identifier as provided by UE 101. In some embodiments, UE 101 may provide other information in addition to or in lieu of the session identifier, such as an identifier (e.g., IP address, MDN, IMSI, etc.) of another UE involved in the communication session.

Process 1100 may additionally include encrypting (at 1112) a communication session using a send key (e.g., which may be generated based on the root public key, as well as the root private key and/or one or more other keys, as discussed above). Process 1100 may additionally include outputting (at 1114) the encrypted communication via the communication session, such as to a UE 101 with which the communication session was established (at 1102).

FIG. 12 illustrates an example process 1200 for utilizing KES 700 as a fallback for private blockchain system 109 for a key retrieval procedure, in accordance with some embodiments. In some embodiments, some or all of process 1200 may be performed by one or more UEs 101 (e.g., UEs 101 engaged in a communication session with each other and/or one or more other UEs 101). In some embodiments, one or more other devices may perform some or all of process 1200 in concert with, and/or in lieu of, UE 101.

As shown, process 1200 may include establishing (at 1202) a communication session associated with a session identifier, as similarly discussed above. In some embodiments, process 1200 may further include registering (at 1204) with KES 700, as similarly discussed above.

Process 1200 may additionally include receiving (at 1206) an encrypted message via the communication session. In some embodiments, the encrypted message may include an indication that KES 700 maintains one or more keys (e.g., a public root key) that may be used to decrypt the communication.

Additionally, or alternatively, process 1200 may also include attempting (at 1208) to retrieve the public root key from private blockchain system 109. As discussed above, the attempt may be unsuccessful due to unavailability of one or more nodes 111 of private blockchain system 109 and/or due to one or more other factors. In some embodiments, UE 101 may refrain from attempting (at 1208) to retrieve the public root key from private blockchain system 109, such as in situations where the encrypted message includes and/or is otherwise associated with an indication to obtain the public root key from KES 700.

Process 1200 may further include obtaining (at 1210) the public root key from KES 700 based on the unsuccessful attempt (at 1208) to obtain the public root key from private blockchain system 109, and/or based on receiving an indication (e.g., with the encrypted message at 1206) to obtain the public root key from KES 700. Process 1200 may additionally include decrypting (at 1212) the message using a receive key generated based on the retrieved public root key and/or one or more other keys, as discussed above.

Figure 13:
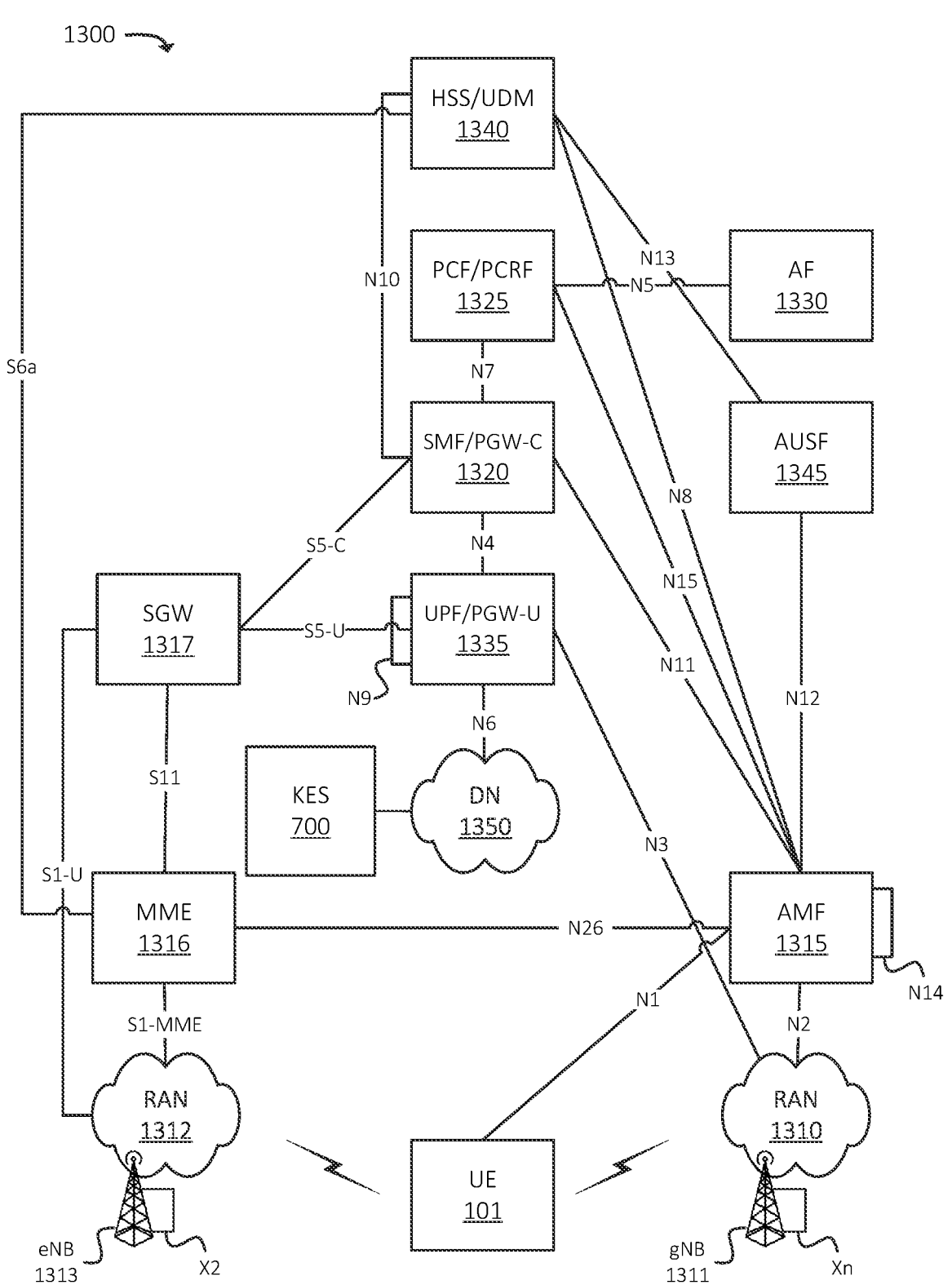
FIG. 13 illustrates an example environment in which one or more embodiments, described herein, may be implemented.

FIG. 13 illustrates an example environment 1300, in which one or more embodiments may be implemented. In some embodiments, environment 1300 may correspond to a Fifth Generation ("5G") network, and/or may include elements of a 5G network. In some embodiments, environment 1300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1300 may include UE 101, RAN 1310 (which may include one or more Next Generation Node Bs ("gNBs") 1311), RAN 1312 (which may include one or more evolved Node Bs ("eNBs") 1313), and various network functions such as Access and Mobility Management Function ("AMF") 1315, Mobility Management Entity ("MME") 1316, Serving Gateway ("SGW") 1317, Session Management Function ("SMF")/ Packet Data Network ("PDN") Gateway ("PGW")-Control plane function ("PGW-C") 1320, Policy Control Function ("PCF")/Policy Charging and Rules Function ("PCRF") 1325, Application Function ("AF") 1330, User Plane Function ("UPF")/PGW-User plane function ("PGW-U") 1335, Home Subscriber Server ("HSS")/Unified Data Management ("UDM") 1340, Authentication Server Function ("AUSF") 1345, and KES 700. Environment 1300 may also include one or more networks, such as Data Network ("DN") 1350.

The example shown in FIG. 13 illustrates one instance of each network component or function (e.g., one instance of SMF/PGW-C 1320, PCF/PCRF 1325, UPF/PGW-U 1335, HSS/UDM 1340, and/or AUSF 1345). In practice, environment 1300 may include multiple instances of such components or functions. For example, in some embodiments, environment 1300 may include multiple "slices" of a core network, where each slice includes a discrete set of network functions (e.g., one slice may include a first instance of SMF/PGW-C 1320, PCF/PCRF 1325, UPF/PGW-U 1335, HSS/UDM 1340, and/or AUSF 1345, while another slice may include a second instance of SMF/PGW-C 1320, PCF/ PCRF 1325, UPF/PGW-U 1335, HSS/UDM 1340, and/or AUSF 1345). The different slices may provide differentiated levels of service, such as service in accordance with different Quality of Service ("QoS") parameters.

The quantity of devices and/or networks, illustrated in FIG. 13, is provided for explanatory purposes only. In practice, environment 1300 may include additional devices and/or networks, fewer devices and/or networks, different devices and/or networks, or differently arranged devices and/or networks than illustrated in FIG. 13. For example, while not shown, environment 1300 may include devices that facilitate or enable communication between various components shown in environment 1300, such as routers, modems, gateways, switches, hubs, etc. Alternatively, or additionally, one or more of the devices of environment 1300 may perform one or more network functions described as being performed by another one or more of the devices of environment 1300. Devices of environment 1300 may interconnect with each other and/or other devices via wired connections, wireless connections, or a combination of wired and wireless connections. In some implementations, one or more devices of environment 1300 may be physically integrated in, and/or may be physically attached to, one or more other devices of environment 1300.

UE 101 may include a computation and communication device, such as a wireless mobile communication device that is capable of communicating with RAN 1310, RAN 1312, and/or DN 1350. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 1350 via RAN 1310, RAN 1312, and/or UPF/PGW-U 1335.

RAN 1310 may be, or may include, a 5G RAN that includes one or more base stations (e.g., one or more gNBs 1311), via which UE 101 may communicate with one or more other elements of environment 1300. UE 101 may communicate with RAN 1310 via an air interface (e.g., as provided by gNB 1311). For instance, RAN 1310 may receive traffic (e.g., voice call traffic, data traffic, messaging traffic, signaling traffic, etc.) from UE 101 via the air interface, and may communicate the traffic to UPF/PGW-U 1335, and/or one or more other devices or networks. Similarly, RAN 1310 may receive traffic intended for UE 101 (e.g., from UPF/PGW-U 1335, AMF 1315, and/or one or more other devices or networks) and may communicate the traffic to UE 101 via the air interface.

RAN 1312 may be, or may include, a LTE RAN that includes one or more base stations (e.g., one or more eNBs 1313), via which UE 101 may communicate with one or more other elements of environment 1300. UE 101 may communicate with RAN 1312 via an air interface (e.g., as provided by eNB 1313). For instance, RAN 1310 may receive traffic (e.g., voice call traffic, data traffic, messaging traffic, signaling traffic, etc.) from UE 101 via the air interface, and may communicate the traffic to UPF/PGW-U 1335, and/or one or more other devices or networks. Similarly, RAN 1310 may receive traffic intended for UE 101 (e.g., from UPF/PGW-U 1335, SGW 1317, and/or one or more other devices or networks) and may communicate the traffic to UE 101 via the air interface.

AMF 1315 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1310 and/or gNBs 1311, and/or to perform other operations. In some embodiments, the 5G network may include multiple AMFs 1315, which communicate with each other via the N14 interface (denoted in FIG. 13 by the line marked "N14" originating and terminating at AMF 1315).

MME 1316 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1312 and/or eNBs 1313, and/or to perform other operations.

SGW 1317 may include one or more devices, systems, VNFs, etc., that aggregate traffic received from one or more eNBs 1313 and send the aggregated traffic to an external network or device via UPF/PGW-U 1335. Additionally, SGW 1317 may aggregate traffic received from one or more UPF/PGW-Us 1335 and may send the aggregated traffic to one or more eNBs 1313. SGW 1317 may operate as an anchor for the user plane during inter-eNB handovers and as an anchor for mobility between different telecommunication networks or RANs (e.g., RANs 1310 and 1312).

SMF/PGW-C 1320 may include one or more devices, systems, VNFs, etc., that gather, process, store, and/or provide information in a manner described herein. SMF/ PGW-C 1320 may, for example, facilitate the establishment of communication sessions on behalf of UE 101. In some embodiments, the establishment of communications sessions may be performed in accordance with one or more policies provided by PCF/PCRF 1325.

PCF/PCRF 1325 may include one or more devices, systems, VNFs, etc., that aggregate information to and from the 5G network and/or other sources. PCF/PCRF 1325 may receive information regarding policies and/or subscriptions from one or more sources, such as subscriber databases and/or from one or more users (such as, for example, an administrator associated with PCF/PCRF 1325).

AF 1330 may include one or more devices, systems, VNFs, etc., that receive, store, and/or provide information that may be used in determining parameters (e.g., quality of service parameters, charging parameters, or the like) for certain applications.

UPF/PGW-U 1335 may include one or more devices, systems, VNFs, etc., that receive, store, and/or provide data (e.g., user plane data). For example, UPF/PGW-U 1335 may receive user plane data (e.g., voice call traffic, data traffic, etc.), destined for UE 101, from DN 1350, and may forward the user plane data toward UE 101 (e.g., via RAN 1310, SMF/PGW-C 1320, and/or one or more other devices). In some embodiments, multiple UPFs 1335 may be deployed (e.g., in different geographical locations), and the delivery of content to UE 101 may be coordinated via the N9 interface (e.g., as denoted in FIG. 13 by the line marked "N9" originating and terminating at UPF/PGW-U 1335). Similarly, UPF/PGW-U 1335 may receive traffic from UE 101 (e.g., via RAN 1310, SMF/PGW-C 1320, and/or one or more other devices), and may forward the traffic toward DN 1350. In some embodiments, UPF/PGW-U 1335 may communicate (e.g., via the N4 interface) with SMF/PGW-C 1320, regarding user plane data processed by UPF/PGW-U 1335.

HSS/UDM 1340 and AUSF 1345 may include one or more devices, systems, VNFs, etc., that manage, update, and/or store, in one or more memory devices associated with AUSF 1345 and/or HSS/UDM 1340, profile information associated with a subscriber. AUSF 1345 and/or HSS/UDM 1340 may perform authentication, authorization, and/or accounting operations associated with the subscriber and/or a communication session with UE 101.

DN 1350 may include one or more wired and/or wireless networks. For example, DN 1350 may include an Internet Protocol IP-based PDN, a wide area network ("WAN") such as the Internet, a private enterprise network, and/or one or more other networks. UE 101 may communicate, through DN 1350, with data servers, other UEs 101, and/or to other servers or applications that are coupled to DN 1350. DN 1350 may be connected to one or more other networks, such as a public switched telephone network ("PSTN"), a public land mobile network ("PLMN"), and/or another network. DN 1350 may be connected to one or more devices, such as content providers, applications, web servers, and/or other devices, with which UE 101 may communicate.

Figure 14:
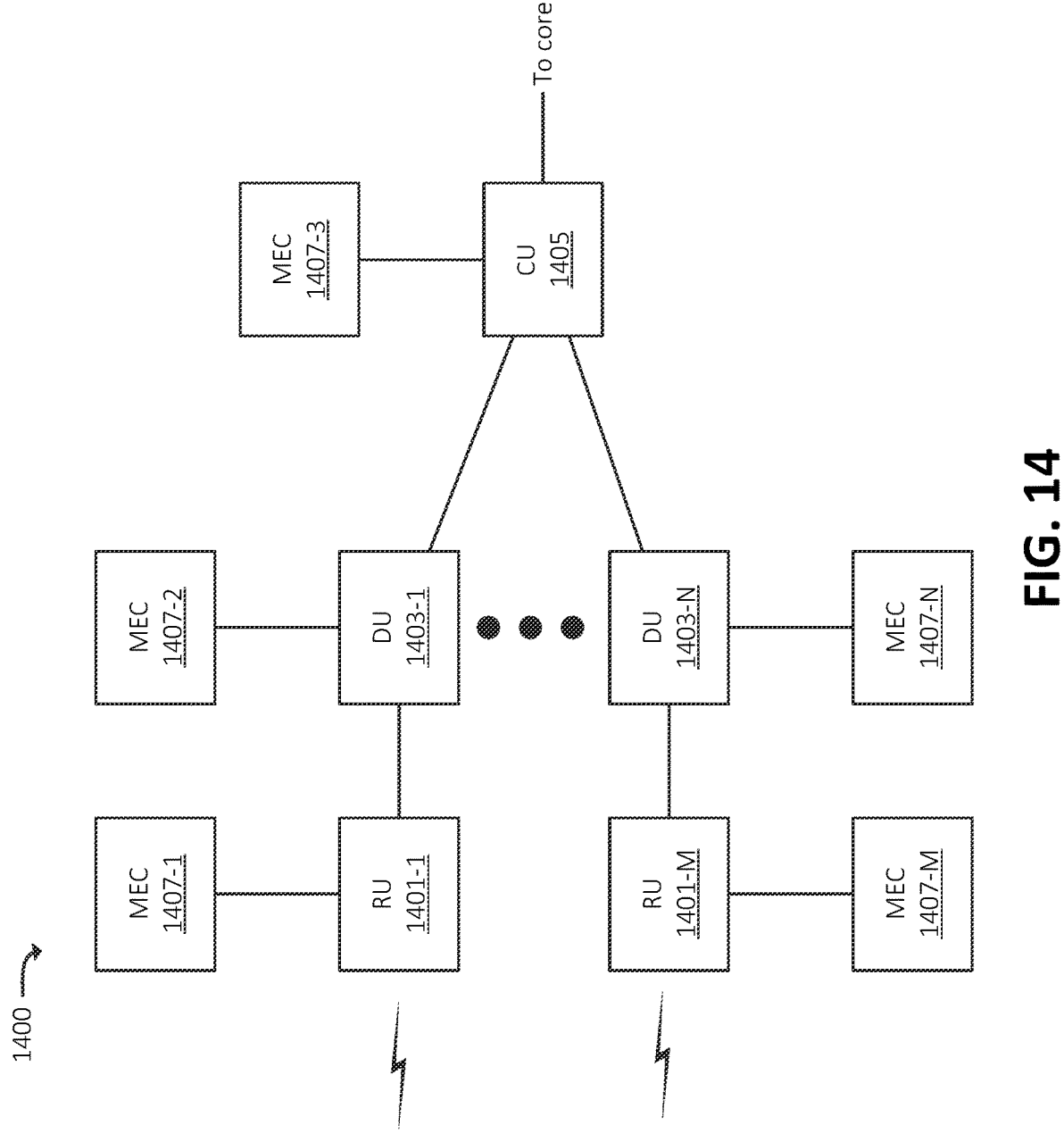
FIG. 14 illustrates an example arrangement of a radio access network ("RAN"), in accordance with some embodiments.

FIG. 14 illustrates an example Distributed Unit ("DU") network 1400, which may be included in and/or implemented by one or more RANs (e.g., RAN 1310, RAN 1312, or some other RAN). In some embodiments, a particular RAN may include one DU network 1400. In some embodiments, a particular RAN may include multiple DU networks 1400. In some embodiments, DU network 1400 may correspond to a particular gNB 1311 of a 5G RAN (e.g., RAN 1310). In some embodiments, DU network 1400 may correspond to multiple gNBs 1311. In some embodiments, DU network 1400 may correspond to one or more other types of base stations of one or more other types of RANs. As shown, DU network 1400 may include Centralized Unit ("CU") 1405, one or more Distributed Units ("DUs") 1403-1 through 1403-N (referred to individually as "DU 1403," or collectively as "DUs 1403"), and one or more Radio Units ("RUs") 1401-1 through 1401-M (referred to individually as "RU 1401," or collectively as "RUs 1401").

CU 1405 may communicate with a core of a wireless network (e.g., may communicate with one or more of the devices or systems described above with respect to FIG. 13, such as AMF 1315 and/or UPF/PGW-U 1335). In the uplink direction (e.g., for traffic from UEs 101 to a core network), CU 1405 may aggregate traffic from DUs 1403, and forward the aggregated traffic to the core network. In some embodiments, CU 1405 may receive traffic according to a given protocol (e.g., Radio Link Control ("RLC")) from DUs 1403, and may perform higher-layer processing (e.g., may aggregate/process RLC packets and generate Packet Data Convergence Protocol ("PDCP") packets based on the RLC packets) on the traffic received from DUs 1403.

In accordance with some embodiments, CU 1405 may receive downlink traffic (e.g., traffic from the core network) for a particular UE 101, and may determine which DU(s) 1403 should receive the downlink traffic. DU 1403 may include one or more devices that transmit traffic between a core network (e.g., via CU 1405) and UE 101 (e.g., via a respective RU 1401). DU 1403 may, for example, receive traffic from RU 1401 at a first layer (e.g., physical ("PHY") layer traffic, or lower PHY layer traffic), and may process/ aggregate the traffic to a second layer (e.g., upper PHY and/or RLC). DU 1403 may receive traffic from CU 1405 at the second layer, may process the traffic to the first layer, and provide the processed traffic to a respective RU 1401 for transmission to UE 101.

RU 1401 may include hardware circuitry (e.g., one or more RF transceivers, antennas, radios, and/or other suitable hardware) to communicate wirelessly (e.g., via an RF interface) with one or more UEs 101, one or more other DUs 1403 (e.g., via RUs 1401 associated with DUs 1403), and/or any other suitable type of device. In the uplink direction, RU 1401 may receive traffic from UE 101 and/or another DU 1403 via the RF interface and may provide the traffic to DU 1403. In the downlink direction, RU 1401 may receive traffic from DU 1403, and may provide the traffic to UE 101 and/or another DU 1403.

RUs 1401 may, in some embodiments, be communicatively coupled to one or more Multi-Access/Mobile Edge Computing ("MEC") devices, referred to sometimes herein simply as "MECs" 1407. For example, RU 1401-1 may be communicatively coupled to MEC 1407-1, RU 1401-M may be communicatively coupled to MEC 1407-M, DU 1403-1 may be communicatively coupled to MEC 1407-2, DU 1403-N may be communicatively coupled to MEC 1407-N, CU 1405 may be communicatively coupled to MEC 1407-3, and so on. MECs 1407 may include hardware resources (e.g., configurable or provisionable hardware resources) that may be configured to provide services and/or otherwise process traffic to and/or from UE 101, via a respective RU 1401.

For example, RU 1401-1 may route some traffic, from UE 101, to MEC 1407-1 instead of to a core network (e.g., via DU 1403 and CU 1405). MEC 1407-1 may process the traffic, perform one or more computations based on the received traffic, and may provide traffic to UE 101 via RU 1401-1. In this manner, ultra-low latency services may be provided to UE 101, as traffic does not need to traverse DU 1403, CU 1405, and an intervening backhaul network between DU network 1400 and the core network. In some embodiments, MEC 1407 may include, and/or may implement, some or all of the functionality described above with respect to one or more nodes 111.

Figure 15:
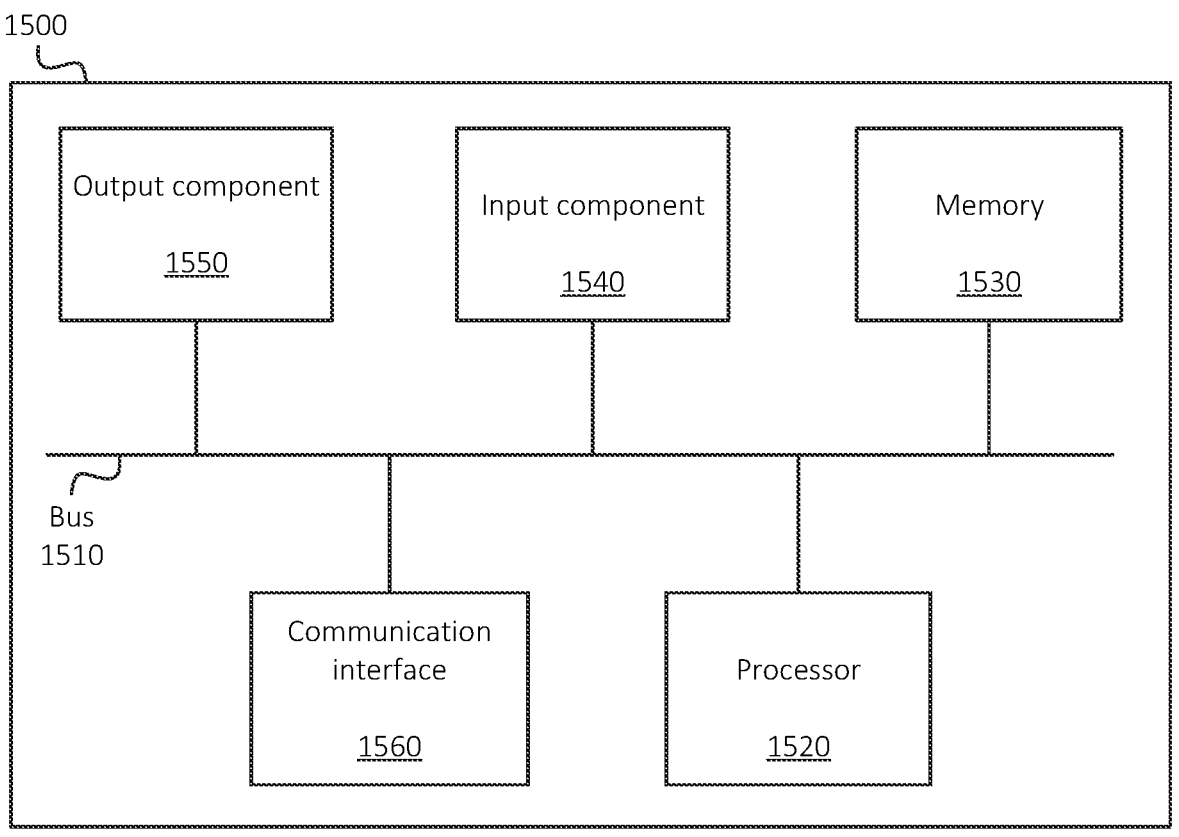
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. In some embodiments, processor 1520 may be or may include one or more hardware processors. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-12), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A first device, comprising:
    one or more hardware processors configured to:
        encrypt a communication using a first key;
        output the encrypted communication to a second device;
        attempt to record, to a blockchain system, a second key that is associated with the first key, wherein the blockchain system includes a plurality of computing devices that each implement a respective node of the blockchain system, wherein attempting to record the second key includes outputting the second key to a particular computing device of the plurality of computing devices of the blockchain system;

determine, after outputting the second key to the particular computing device, that the second key was not recorded to a blockchain maintained by the blockchain system, wherein determining that the second key was not recorded to the blockchain includes determining that a threshold minimum quantity of confirmations of recording the second key to the blockchain were not received from the plurality of computing devices of the blockchain system within a threshold duration of time after outputting the second key to the particular computing device; and output the second key to a third device based on determining that the second key was not recorded to the blockchain maintained by the blockchain system, wherein the second device:

obtains the second key from the third device, and uses the second key to decrypt the encrypted communication.

2. The first device of claim 1, wherein the one or more hardware processors are further configured to:

output, to the second device, an indication based on the second key not being recorded to the blockchain, wherein the second device obtains the second key from the third device based on the indication that the second key was not recorded to the blockchain.

3. The first device of claim 2, wherein the indication includes at least one of:

an identifier of the third device, or an identifier of one or more records, maintained by the third device, that are associated with the second key.

4. The first device of claim 1, wherein the second device attempts to retrieve the second key from the blockchain system, and obtains the second key from the third device based on being unsuccessful in retrieving the second key from the blockchain system.

5. The first device of claim 1, wherein the encrypted communication is associated with a session identifier, wherein outputting the second key to the third device includes outputting the session identifier to the third device, wherein the second device uses the session identifier to obtain the second key from the third device.

6. The first device of claim 1, wherein the communication is a first communication, wherein the threshold duration of time is a first threshold duration of time, wherein the one or more hardware processors are further configured to:

determine that a second threshold duration of time has passed since the attempt to record the second key to the blockchain maintained by the blockchain system;

encrypt a second communication using a third key; and based on determining that the second threshold duration of time has passed since the attempt to record the second key to the blockchain system, record a fourth key, that is associated with the third key, to the blockchain maintained by the blockchain system.

7. The first device of claim 6, wherein the one or more hardware processors are further configured to:

output the encrypted second communication to the second device, wherein the second device obtains the fourth key from the blockchain system and uses the fourth key to decrypt the encrypted second communication.

8. A system, comprising:

a first device, comprising one or more hardware processors configured to:

encrypt a communication using a first key;

output the encrypted communication to a second device;

attempt to record, to a blockchain system, a second key that is associated with the first key, wherein the blockchain system includes a plurality of computing devices that each implement a respective node of the blockchain system, wherein attempting to record the second key includes outputting the second key to a particular computing device of the plurality of computing devices of the blockchain system;

determine, after outputting the second key to the particular computing device, that the second key was not recorded to a blockchain maintained by the blockchain system, wherein determining that the second key was not recorded to the blockchain includes determining that a threshold minimum quantity of confirmations of recording the second key to the blockchain were not received from the plurality of computing devices of the blockchain system within a threshold duration of time after outputting the second key to the particular computing device; and output the second key to a third device based on determining that the second key was not recorded to the blockchain maintained by the blockchain system; and the second device, wherein the second device comprises one or more hardware processors configured to:

obtain the second key from the third device; and use the second key to decrypt the encrypted communication.

9. The system of claim 8, wherein the first device is further configured to:

output, to the second device, an indication based on the second key not being recorded to the blockchain, wherein the second device obtains the second key from the third device based on the indication that the second key was not recorded to the blockchain.

10. The system of claim 9, wherein the indication includes at least one of:

an identifier of the third device, or an identifier of one or more records, maintained by the third device, that are associated with the second key.

11. The system of claim 8, wherein the second device is further configured to:

attempt to retrieve the second key from the blockchain system; and obtain the second key from the third device based on being unsuccessful in retrieving the second key from the blockchain system.

12. The system of claim 8, wherein the encrypted communication is associated with a session identifier, wherein outputting the second key to the third device includes outputting the session identifier to the third device, wherein the second device uses the session identifier to obtain the second key from the third device.

13. The system of claim 8, wherein the first and second keys are associated with a double ratchet encryption technique.

14. The system of claim 8, wherein the communication is a first communication, wherein the threshold duration of time is a first threshold duration of time, wherein the first device is further configured to:

determine that a second threshold duration of time has passed since the attempt to record the second key to the blockchain maintained by the blockchain system;

encrypt a second communication using a third key; and based on determining that the second threshold duration of time has passed since the attempt to record the second key to the blockchain system, recording a fourth key, that is associated with the third key, to the blockchain maintained by the blockchain system.

15. A method, comprising:

encrypting, by a first device, a communication using a first key;

outputting the encrypted communication to a second device;

attempting to record, to a blockchain system, a second key that is associated with the first key, wherein the blockchain system includes a plurality of computing devices that each implement a respective node of the blockchain system, wherein attempting to record the second key includes outputting the second key to a particular computing device of the plurality of computing devices of the blockchain system;

determining, after outputting the second key to the particular computing device, that the second key was not recorded to a blockchain maintained by the blockchain system, wherein determining that the second key was not recorded to the blockchain includes determining that a threshold minimum quantity of confirmations of recording the second key to the blockchain were not received from the plurality of computing devices of the blockchain system within a threshold duration of time after outputting the second key to the particular computing device; and outputting the second key to a third device based on determining that the second key was not recorded to the blockchain maintained by the blockchain system, wherein the second device:

obtains the second key from the third device, and uses the second key to decrypt the encrypted communication.

16. The method of claim 15, further comprising:

outputting, to the second device, an indication based on the second key not being recorded to the blockchain, wherein the indication includes at least one of:

an identifier of the third device, or an identifier of one or more records, maintained by the third device, that are associated with the second key, wherein the second device obtains the second key from the third device based on the indication that the second key was not recorded to the blockchain.

17. The method of claim 15, wherein the second device attempts to retrieve the second key from the blockchain system, and obtains the second key from the third device based on being unsuccessful in retrieving the second key from the blockchain system.

18. The method of claim 15, wherein the encrypted communication is associated with a session identifier, wherein outputting the second key to the third device includes outputting the session identifier to the third device, wherein the second device uses the session identifier to obtain the second key from the third device.

19. The method of claim 15, wherein the communication is a first communication, wherein the threshold duration of time is a first threshold duration of time, the method further comprising:

determining that a second threshold duration of time has passed since the attempt to record the second key to the blockchain maintained by the blockchain system;

encrypting a second communication using a third key; and based on determining that the second threshold duration of time has passed since the attempt to record the second key to the blockchain system, recording a fourth key, that is associated with the third key, to the blockchain system.

20. The method of claim 19, further comprising:

outputting the encrypted second communication to the second device, wherein the second device obtains the fourth key from the blockchain system and uses the fourth key to decrypt the encrypted second communication.

\* \* \* \* \*